(12) United States Patent
Yoshitsugu et al.

(10) Patent No.: US 7,307,797 B2
(45) Date of Patent: Dec. 11, 2007

(54) ZOOM LENS SYSTEM, LENS BARREL, IMAGING DEVICE AND CAMERA

(75) Inventors: Keiki Yoshitsugu, Hyogo (JP); Takakazu Bito, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/705,423

(22) Filed: Feb. 13, 2007

(65) Prior Publication Data
US 2007/0188631 A1 Aug. 16, 2007

(30) Foreign Application Priority Data
Feb. 13, 2006 (JP) ............... 2006-035391

(51) Int. Cl.
*G02B 15/14* (2006.01)
(52) U.S. Cl. ............. 359/689; 359/557; 359/676; 359/683; 359/684; 359/685; 359/726; 359/727; 359/728; 359/737; 359/694; 396/73; 396/85
(58) Field of Classification Search ........... 359/557, 359/676, 683–688, 726–728, 694–701; 396/73, 396/85
See application file for complete search history.

(56) References Cited

U.S. PATENT DOCUMENTS

| | | | | |
|---|---|---|---|---|
| 4,707,103 | A * | 11/1987 | Ikemori et al. ........... | 396/80 |
| 7,206,139 | B2 * | 4/2007 | Bito et al. ............. | 359/690 |
| 2003/0156832 | A1 | 8/2003 | Nomura et al. | |
| 2003/0161620 | A1 | 8/2003 | Hagimori et al. | |
| 2003/0206352 | A1 | 11/2003 | Mihara et al. | |
| 2004/0141065 | A1 | 7/2004 | Hara et al. | |
| 2005/0036777 | A1 | 2/2005 | Nomura et al. | |
| 2006/0285841 | A1 * | 12/2006 | Masui et al. ........... | 396/72 |

FOREIGN PATENT DOCUMENTS

| | | |
|---|---|---|
| JP | 2003-156789 | 5/2003 |
| JP | 2003-169236 | 6/2003 |
| JP | 2003-202500 | 7/2003 |
| JP | 2003-315861 | 11/2003 |
| JP | 2004-004533 | 1/2004 |
| JP | 2004-102089 | 4/2004 |
| JP | 2004-118101 | 4/2004 |
| JP | 2004-219930 | 8/2004 |

* cited by examiner

*Primary Examiner*—Evelyn A. Lester
(74) *Attorney, Agent, or Firm*—McDermott Will & Emery LLP

(57) ABSTRACT

A zoom lens system comprising a plurality of lens units each composed of at least one lens element, wherein an interval between at least any two lens units is changed so that an optical image is formed with a continuously variable magnification, the zoom lens system comprises a first lens unit having positive power, a second lens unit that includes a lens element having a reflecting surface and has negative power and subsequent lens units including at least one lens unit having positive power, and the condition: $0.50 < (C-S)/H < 1.00$ ($C = \sqrt{(2R \cdot d_R - d_R^2)}$, S is a sag of the image side surface of the most object side lens element in the second lens unit at height H, H is one-half of an optical axial thickness of the lens element having a reflecting surface, R is a radius of curvature of the image side surface, and $d_R$ is an interval between the most object side lens element and the lens element having a reflecting surface) is satisfied.

17 Claims, 25 Drawing Sheets

FIG. 12A
FIG. 12B
FIG. 12C
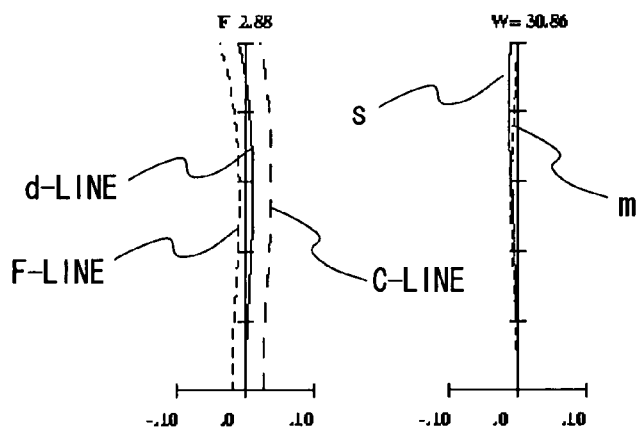
FIG. 12D
FIG. 12E
FIG. 12F
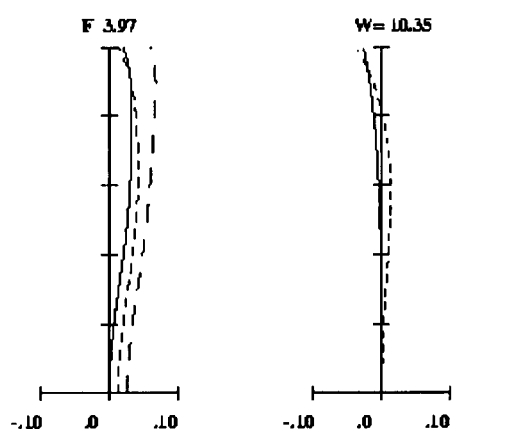
FIG. 12G
FIG. 12H
FIG. 12I
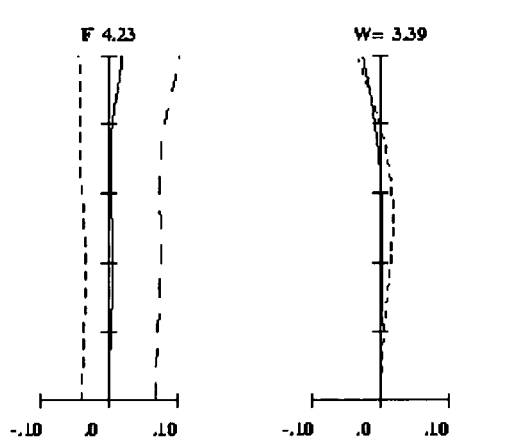
SPHERICAL ABERRATION (mm)   ASTIGMATISM (mm)   DISTORTION (%)

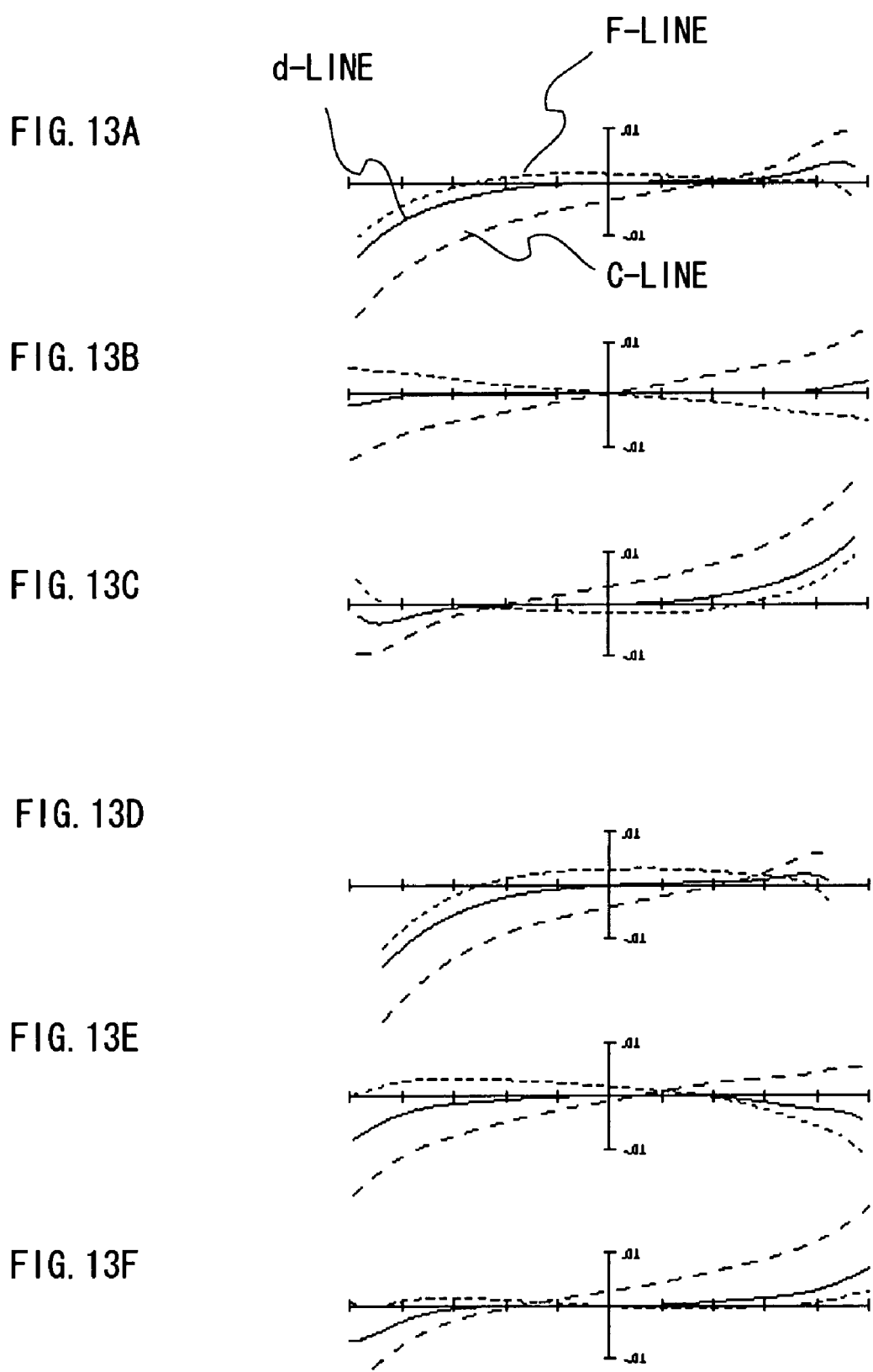

FIG. 15A
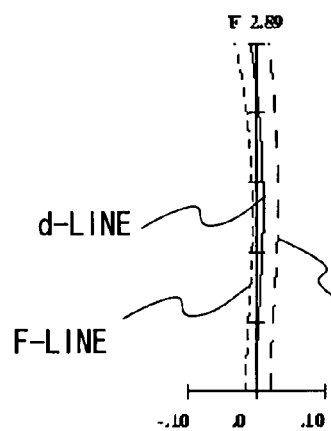
FIG. 15B
FIG. 15C
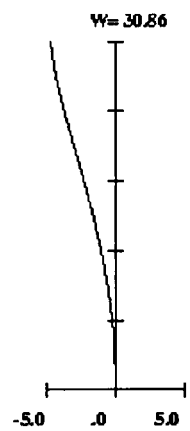
FIG. 15D
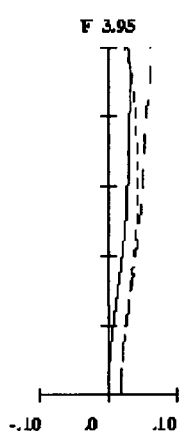
FIG. 15E
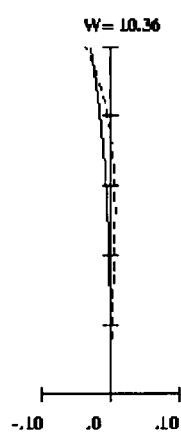
FIG. 15F
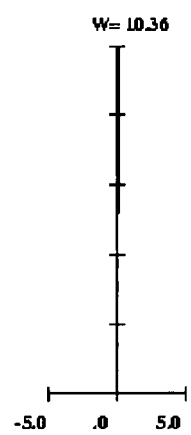
FIG. 15G
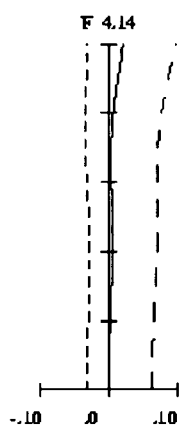
FIG. 15H
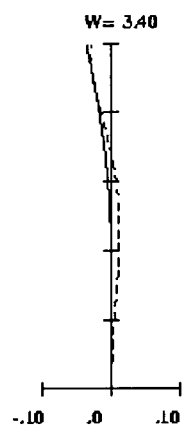
FIG. 15I
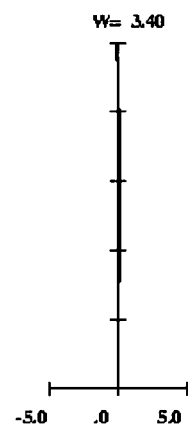
SPHERICAL ABERRATION (mm)   ASTIGMATISM (mm)   DISTORTION (%)

SPHERICAL ABERRATION (mm)   ASTIGMATISM (mm)   DISTORTION (%)

SPHERICAL ABERRATION (mm)   ASTIGMATISM (mm)   DISTORTION (%)

SPHERICAL ABERRATION (mm)　　ASTIGMATISM (mm)　　DISTORTION (%)

ZOOM LENS SYSTEM, LENS BARREL, IMAGING DEVICE AND CAMERA

CROSS-REFERENCE TO RELATED APPLICATION

This application is based on application No. 2006-35391 filed in Japan on Feb. 13, 2006, the content of which is hereby incorporated by reference.

BACKGROUND

1. Technical Field

The present invention relates to a zoom lens system, a lens barrel, an imaging device and a camera. In particular, the present invention relates to: a zoom lens system that is used suitably in a small and high-image quality camera such as a digital still camera or a digital video camera, and that has a large variable magnification ratio and a high resolution; a lens barrel that holds this zoom lens system and has a short overall length at the time of accommodation as well as a low overall height; an imaging device including this lens barrel; and a thin and compact camera employing this imaging device.

2. Description of the Background Art

With recent progress in the development of solid-state image sensors such as a CCD (Charge Coupled Device) and a CMOS (Complementary Metal-Oxide Semiconductor) having a high pixel, digital still cameras and digital video cameras are rapidly spreading that employ an imaging device including an imaging optical system of high optical performance corresponding to the above solid-state image sensors of a high pixel.

Among these, especially in digital still cameras, thin constructions have recently been proposed in order to achieve satisfactory accommodation property or portability to which the highest priority is imparted. As possible means for realizing such thin digital still cameras, a large number of zoom lens systems have been proposed that bend a light beam by 90°.

For example, Japanese Laid-Open Patent Publication No. 2004-004533 and No. 2003-202500 disclose a construction in which in an imaging device provided with a zoom lens system, a right-angle prism provided with an internal reflecting surface for bending a light beam by 90° is arranged inside a lens unit located on the most object side. In the imaging device disclosed in Japanese Laid-Open Patent Publication No. 2004-004533 and No. 2003-202500, since the object light is bent in a plane perpendicular to the optical axis of the incident lens unit, the thickness of the imaging device is determined by the right-angle prism and the lens elements located on the object side relative to the right-angle prism. This reduces the thickness.

Further, Japanese Laid-Open Patent Publication No. 2004-102089 discloses a construction in which in an imaging device provided with a zoom lens system composed of four units having a construction of positive, negative, positive and positive, a right-angle prism provided with an internal reflecting surface for bending a light beam by 90° is arranged inside a second lens unit having negative optical power. In the imaging device described in Japanese Laid-Open Patent Publication No. 2004-102089, the right-angle prism can be arranged inside the lens unit located on the image side relative to the first lens unit having positive optical power. This allows the right-angle prism to be constructed compactly.

Nevertheless, in the zoom lens system disclosed in Japanese Laid-Open Patent Publication No. 2004-004533, although a compact imaging device can be provided, the variable magnification ratio is as small as approximately 3. Further, the optical performance is insufficient in the periphery.

Further, in the zoom lens system disclosed in Japanese Laid-Open Patent Publication No. 2003-202500 and No. 2004-102089, thickness reduction of the imaging device is restricted from their intrinsic construction. Further, optical performance is insufficient in the periphery part.

SUMMARY

An object of the present invention is to provide: a zoom lens system that has a large variable magnification ratio and a high resolution; a lens barrel that holds this zoom lens system and has a short overall length at the time of accommodation as well as a low overall height; an imaging device including this lens barrel; and a thin and compact camera employing this imaging device.

The novel concepts disclosed herein were achieved in order to solve the foregoing problems in the conventional art, and herein is disclosed:

a zoom lens system comprising a plurality of lens units each composed of at least one lens element, wherein an interval between at least any two lens units among the lens units is changed so that an optical image of an object is formed with a continuously variable magnification, the zoom lens system, in order from the object side to the image side, comprises: a first lens unit having positive optical power; a second lens unit that includes a lens element having a reflecting surface for bending a light beam from an object and that has negative optical power; and subsequent lens units including at least one lens unit having positive optical power, and the following condition (1) is satisfied:

$$0.50<(C-S)/H<1.00 \quad (1)$$

where,

C is an effective radius of the image side surface of the most object side lens element in the second lens unit that causes an interval between the image side surface of the most object side lens element in the second lens unit and the lens element having a reflecting surface to be equal to a sag of the image side surface of the most object side lens element in the second lens unit $$C=\sqrt{(2R \cdot d_R - d_R^2)},$$

S is a sag of the image side surface of the most object side lens element in the second lens unit at height H, H is one-half of an optical axial thickness of the lens element having a reflecting surface, R is a radius of curvature of the image side surface of the most object side lens element in the second lens unit, and $d_R$ is an interval between the most object side lens element in the second lens unit and the lens element having a reflecting surface.

The novel concepts disclosed herein were achieved in order to solve the foregoing problems in the conventional art, and herein is disclosed:

a lens barrel for holding an imaging optical system that forms an optical image of an object, wherein the imaging optical system is a zoom lens system comprising a plurality of lens units each composed of at least one lens element, in which an interval between at least any two lens units among the lens units is changed so that an optical image of an object is formed with a continuously variable magnification, the zoom lens system, in order from the object side to the image side, comprises: a first lens unit having positive optical power; a second lens unit that includes a lens element having a reflecting surface for bending a light beam from an object and that has negative optical power; and subsequent lens units including at least one lens unit having positive optical power, and the following condition (1) is satisfied:

$$0.50 < (C-S)/H < 1.00 \qquad (1)$$

where,

C is an effective radius of the image side surface of the most object side lens element in the second lens unit that causes an interval between the image side surface of the most object side lens element in the second lens unit and the lens element having a reflecting surface to be equal to a sag of the image side surface of the most object side lens element in the second lens unit $$C = \sqrt{(2R \cdot d_R - d_R^2)},$$

S is a sag of the image side surface of the most object side lens element in the second lens unit at height H, H is one-half of an optical axial thickness of the lens element having a reflecting surface, R is a radius of curvature of the image side surface of the most object side lens element in the second lens unit, and $d_R$ is an interval between the most object side lens element in the second lens unit and the lens element having a reflecting surface, and wherein in an imaging state, the first lens unit is held in a manner movable in a direction of the light beam from the object, and in an accommodated state, the lens element having a reflecting surface escapes to an escape position different from a position located in the imaging state.

The novel concepts disclosed herein were achieved in order to solve the foregoing problems in the conventional art, and herein is disclosed:

an imaging device capable of outputting an optical image of an object as an electric image signal, comprising an imaging optical system that forms the optical image of the object, and an image sensor that converts the optical image formed by the imaging optical system into the electric image signal, wherein the imaging optical system is a zoom lens system comprising a plurality of lens units each composed of at least one lens element, in which an interval between at least any two lens units among the lens units is changed so that an optical image of an object is formed with a continuously variable magnification, the zoom lens system, in order from the object side to the image side, comprises: a first lens unit having positive optical power; a second lens unit that includes a lens element having a reflecting surface for bending a light beam from an object and that has negative optical power; and subsequent lens units including at least one lens unit having positive optical power, and the following condition (1) is satisfied:

$$0.50 < (C-S)/H < 1.00 \qquad (1)$$

where,

C is an effective radius of the image side surface of the most object side lens element in the second lens unit that causes an interval between the image side surface of the most object side lens element in the second lens unit and the lens element having a reflecting surface to be equal to a sag of the image side surface of the most object side lens element in the second lens unit $$C = \sqrt{(2R \cdot d_R - d_R^2)},$$

S is a sag of the image side surface of the most object side lens element in the second lens unit at height H, H is one-half of an optical axial thickness of the lens element having a reflecting surface, R is a radius of curvature of the image side surface of the most object side lens element in the second lens unit, and $d_R$ is an interval between the most object side lens element in the second lens unit and the lens element having a reflecting surface.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including an imaging optical system that forms the optical image of the object and an image sensor that converts the optical image formed by the imaging optical system into the electric image signal, wherein the imaging optical system is a zoom lens system comprising a plurality of lens units each composed of at least one lens element, in which an interval between at least any two lens units among the lens units is changed so that an optical image of an object is formed with a continuously variable magnification, the zoom lens system, in order from the object side to the image side, comprises: a first lens unit having positive optical power; a second lens unit that includes a lens element having a reflecting surface for bending a light beam from an object and that has negative optical power; and subsequent lens units including at least one lens unit having positive optical power, and the following condition (1) is satisfied:

$$0.50 < (C-S)/H < 1.00 \qquad (1)$$

where,

C is an effective radius of the image side surface of the most object side lens element in the second lens unit that causes an interval between the image side surface of the most object side lens element in the second lens unit and the lens element having a reflecting surface to be equal to a sag of the image side surface of the most object side lens element in the second lens unit $$C = \sqrt{(2R \cdot d_R - d_R^2)},$$

S is a sag of the image side surface of the most object side lens element in the second lens unit at height H, H is one-half of an optical axial thickness of the lens element having a reflecting surface, R is a radius of curvature of the image side surface of the most object side lens element in the second lens unit, and $d_R$ is an interval between the most object side lens element in the second lens unit and the lens element having a reflecting surface.

The present invention provides a zoom lens system that has a large variable magnification ratio and a high resolution. Further, the present invention provides a lens barrel that holds this zoom lens system and that has a short overall length at the time of accommodation as well as a low overall height. Furthermore, the present invention provides an imaging device including this lens barrel and a thin and compact camera employing this imaging device.

BRIEF DESCRIPTION OF THE DRAWINGS

This and other objects and features of this invention will become clear from the following description, taken in conjunction with the preferred embodiments with reference to the accompanied drawings in which:

FIGS. 12A to 12I are longitudinal aberration diagrams of a zoom lens system according to Example 1 in an infinity in-focus condition at a wide-angle limit, a middle position and a telephoto limit;

FIGS. 13A to 13F are lateral aberration diagrams of a zoom lens system according to Example 1 at a telephoto limit;

FIGS. 15A to 15I are longitudinal aberration diagrams of a zoom lens system according to Example 2 in an infinity in-focus condition at a wide-angle limit, a middle position and a telephoto limit;

DESCRIPTION OF THE PREFERRED EMBODIMENTS

Embodiment 1

Figure 1A:
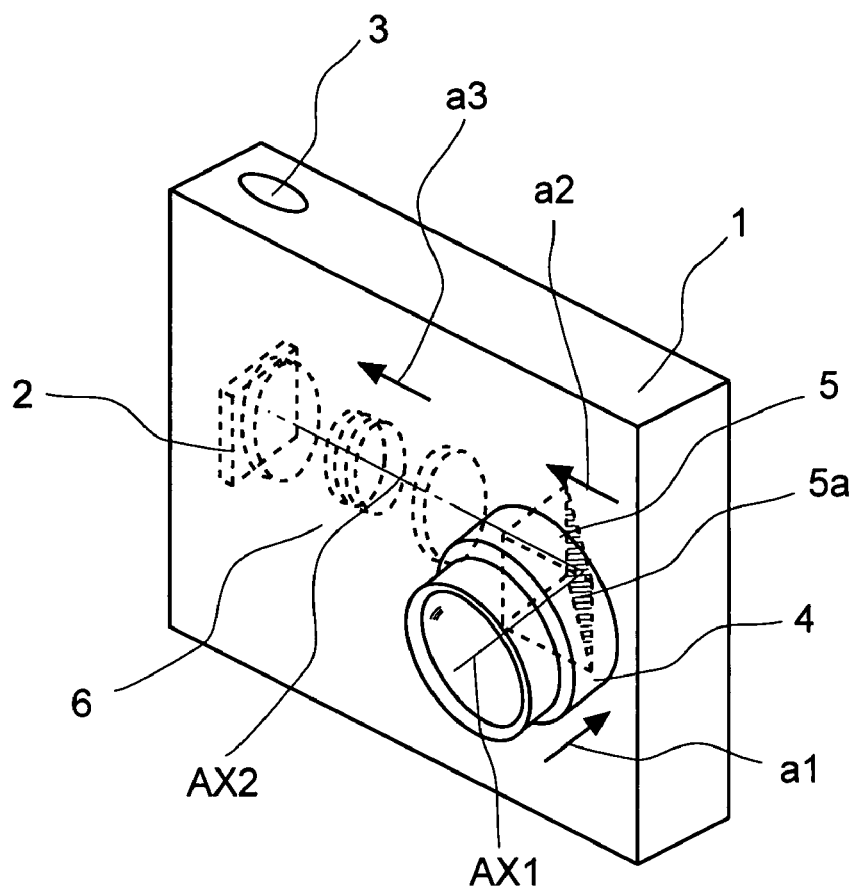
FIG. 1A is a transparent perspective view showing an outline configuration in an imaging state of a camera employing an imaging device according to Embodiment 1.

FIG. 1A is a transparent perspective view showing an outline configuration in the imaging state of a camera employing the imaging device according to Embodiment 1.

Figure 1B:
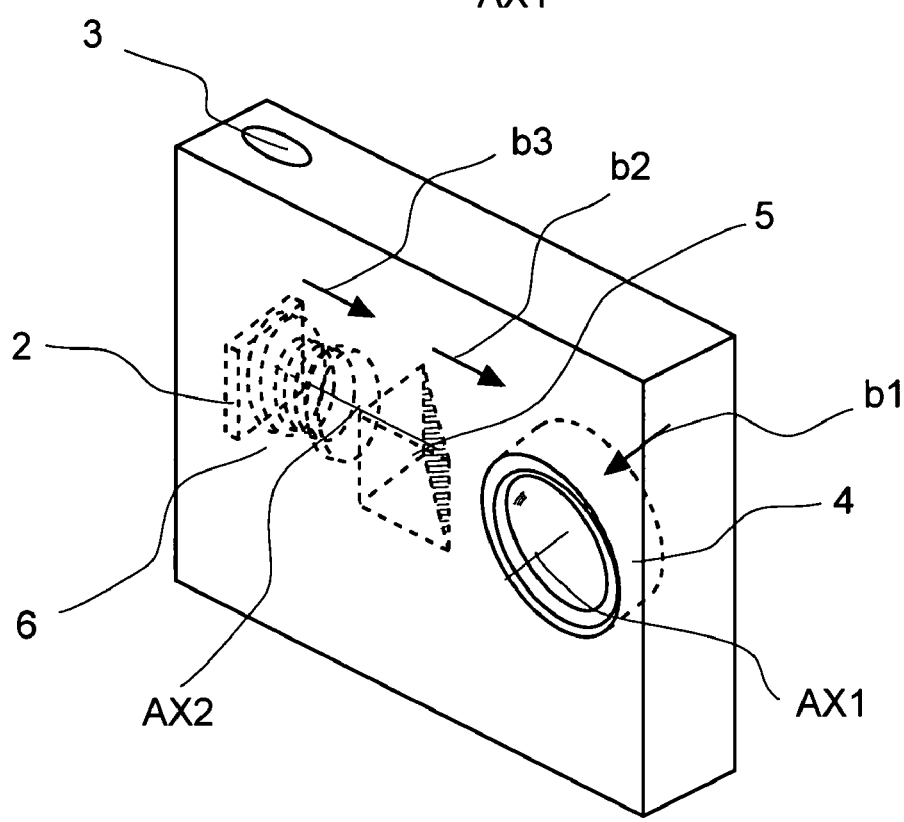
FIG. 1B is a transparent perspective view showing an outline configuration in an accommodated state of a camera employing an imaging device according to Embodiment 1.

FIG. 1B is a transparent perspective view showing an outline configuration in the accommodated state of a camera employing the imaging device according to Embodiment 1. Here, FIGS. 1A and 1B are drawings schematically showing an imaging device according to Embodiment 1. Thus, the scale and the detailed layout can differ from actual ones.

In FIGS. 1A and 1B, a camera employing an imaging device according to Embodiment 1 comprises a body 1, an image sensor 2, a shutter button 3, an object side lens unit 4, a lens element having a reflecting surface, and an image side lens unit 6. Among these, the object side lens unit 4, the lens element 5 having a reflecting surface, and the image side lens unit 6 constitute the zoom lens system, and thereby form an optical image of an object in the light acceptance surface of the image sensor 2. Among these, the zoom lens system is held, for example, by a lens holding barrel in a lens barrel shown in FIG. 3 described later, while the zoom lens system held by the lens holding barrel and the image sensor 2 constitute an imaging device. Thus, the camera comprises: the body 1; and the imaging device constructed from the zoom lens system and the image sensor 2.

In an imaging state shown in FIG. 1A, the image sensor 2 is an image sensor such as a CCD or a CMOS, and generates and outputs an electric image signal on the basis of the optical image formed in the light acceptance surface by the zoom lens system. The shutter button 3 is arranged on the top face of the body 1, and determines the acquisition timing for an image signal of the image sensor 2 when operated by an operator. The object side lens unit 4 is held inside a lens holding barrel which can be expanded and contracted along the direction of the optical axis AX1. The lens element 5 is provided with a reflecting surface 5a for bending a light beam from an object and further bending the light beam into a horizontal direction, that is, a reflecting surface 5a for bending by approximately 90° the optical axis AX1 of the object side lens unit 4 (an axial principal ray from the object), and thereby deflects the object light exiting from the object side lens unit 4 toward the image side lens unit 6. The image side lens unit 6 is arranged on the optical axis AX2, and thereby transmits the object light deflected by the reflecting surface 5a to the image sensor 2.

In an accommodated state shown in FIG. 1B, the object side lens unit 4 is retracted and accommodated into the body 1. The lens element 5 having a reflecting surface arranged on the image side of the object side lens unit 4 in the imaging state is escaped to the image sensor 2 side along the optical axis AX2, that is, on the image side of the zoom lens system. Further, the image side lens unit 6 is also escaped to the image sensor 2 side along the optical axis AX2, that is, on the image side of the zoom lens system. As such, the zoom lens system is completely accommodated into the body 1.

In transition from the imaging state shown in FIG. 1A to the accommodated state shown in FIG. 1B, the image side lens unit 6 first moves toward the image sensor 2 along the optical axis AX2 as indicated by an arrow a3. Then, the lens element 5 having a reflecting surface moves toward the image sensor 2 along the optical axis AX2 as indicated by an arrow a2. Finally, the lens holding barrel that holds the object side lens unit 4 is retracted along the optical axis AX1 as indicated by an arrow a1 into a space formed by the movement of the image side lens unit 6 and the lens element 5 having a reflecting surface. As a result, the transition to the accommodated state is completed.

On the contrary, in transition from the accommodated state shown in FIG. 1B to the imaging state shown in FIG. 1A, the lens holding barrel for holding the object side lens unit 4 is drawn out along the optical axis AX1 as indicated by an arrow b1. Then, the lens element 5 having a reflecting surface moves along the optical axis AX2 as indicated by an arrow b2 into the space formed by the draw-out of the lens holding barrel for holding the object side lens unit 4. Further, the image side lens unit 6 moves along the optical axis AX2 as indicated by an arrow b3, so that the transition to the imaging state is completed.

Figure 2A:
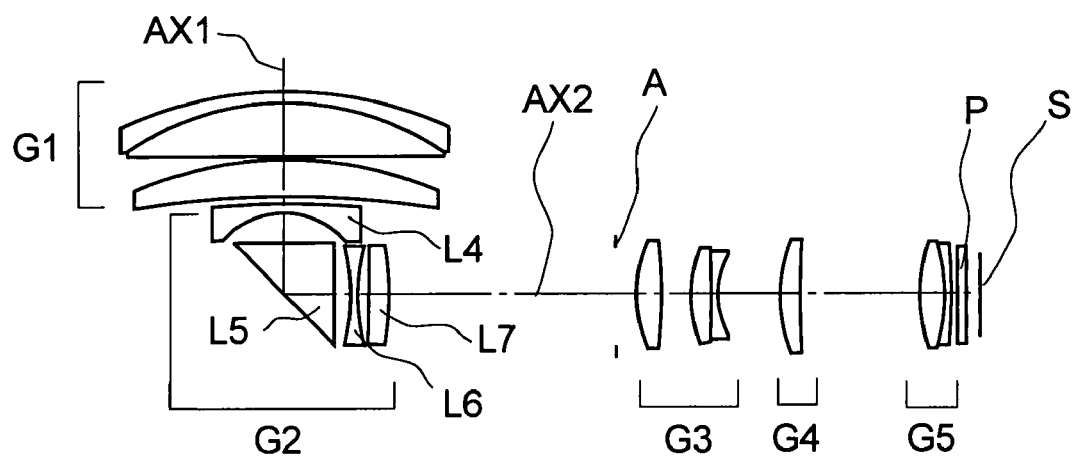
FIG. 2A is a lens arrangement diagram showing an arrangement of an imaging optical system in an imaging state at a wide-angle limit in Embodiment 1.
Figure 2B:
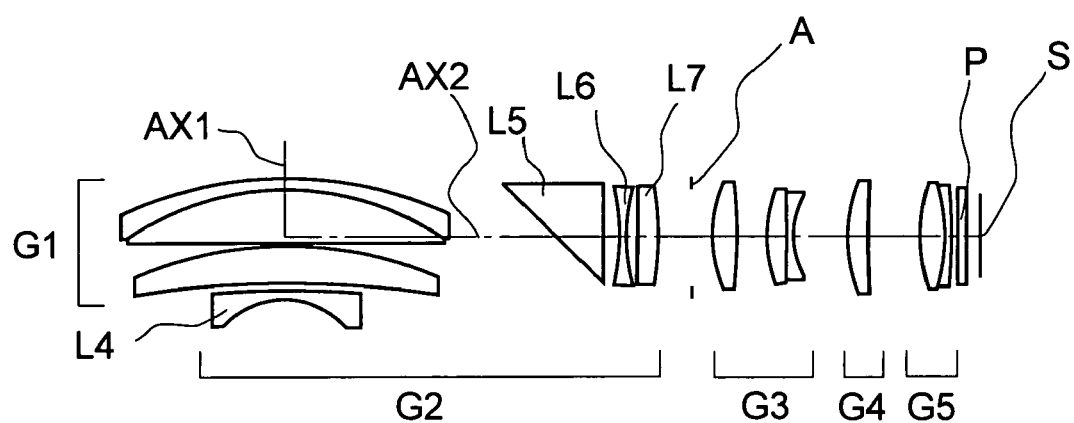
FIG. 2B is a lens arrangement diagram showing an arrangement of an imaging optical system in an accommodated state in Embodiment 1.

FIG. 2A is a lens arrangement diagram showing an arrangement of the zoom lens system in the imaging state at a wide-angle limit in Embodiment 1. FIG. 2B is a lens arrangement diagram showing an arrangement of the zoom lens system in the accommodated state in Embodiment 1. The zoom lens system according to Embodiment 1, in order from the object side to the image side, comprises: a first lens unit G1 having positive optical power; a second lens unit G2 having negative optical power; and subsequently a diaphragm A, a third lens unit G3, a fourth lens unit G4 and a fifth lens unit G5. Further, a straight line drawn on the right most side in the figure indicates the position of an image surface S. On its object side, a plane parallel plate P such as an optical low-pass filter, a face plate of the image sensor or the like is provided. A prism L5 serving as a lens element having a reflecting surface is arranged inside the second lens unit G2.

In the zoom lens system of Embodiment 1, in the accommodated state shown in FIG. 2B, among the second lens unit G2 components, the negative meniscus lens element L4 located on the most object side is accommodated in a manner separated from the prism L5 serving as a lens element having a reflecting surface and the subsequent lens elements L6 and L7. That is, the negative meniscus lens element L4 is held separately from the prism L5 and the subsequent lens elements L6 and L7, and hence is not follow the escape along the optical axis AX2 performed by a lens block consisting of the prism L5 and the subsequent lens elements L6 and L7. Thus, the negative meniscus lens element L4 is retracted and accommodated along the optical axis AX1 together with the first lens unit G1.

Figure 3A:
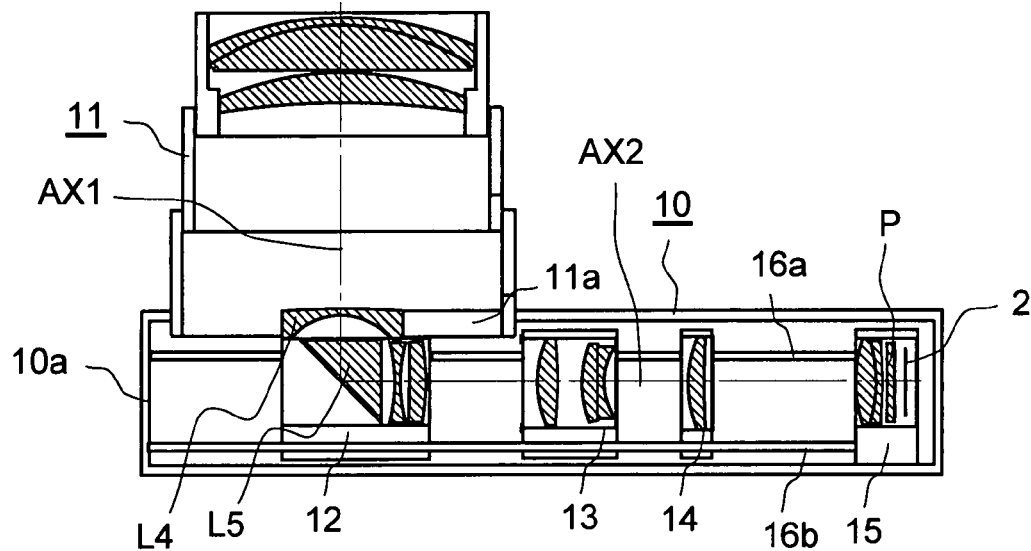
FIGS. 3A to 3C are sectional views showing arrangements of a lens barrel of an imaging device according to Embodiment 1 respectively in an imaging state at a telephoto limit, in an imaging state at a wide-angle limit and in an accommodated state.
Figure 3B:
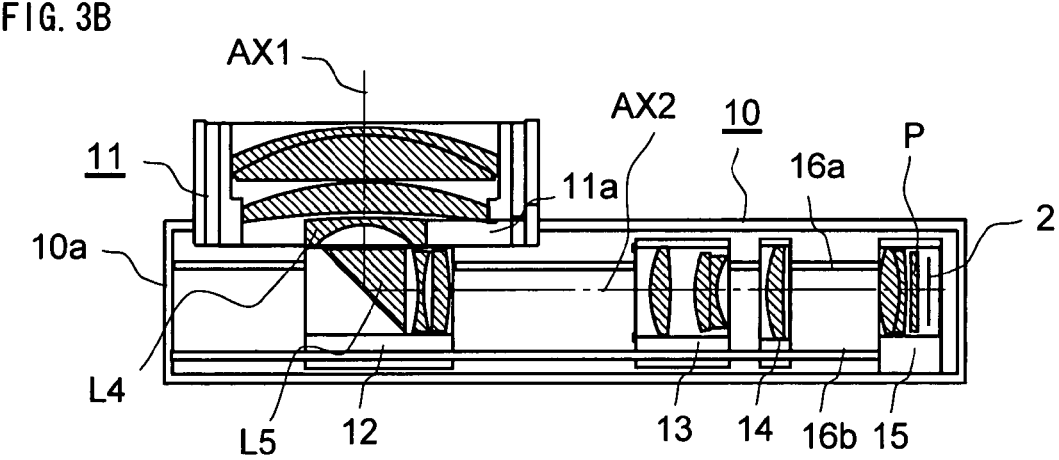
Figure 3C:
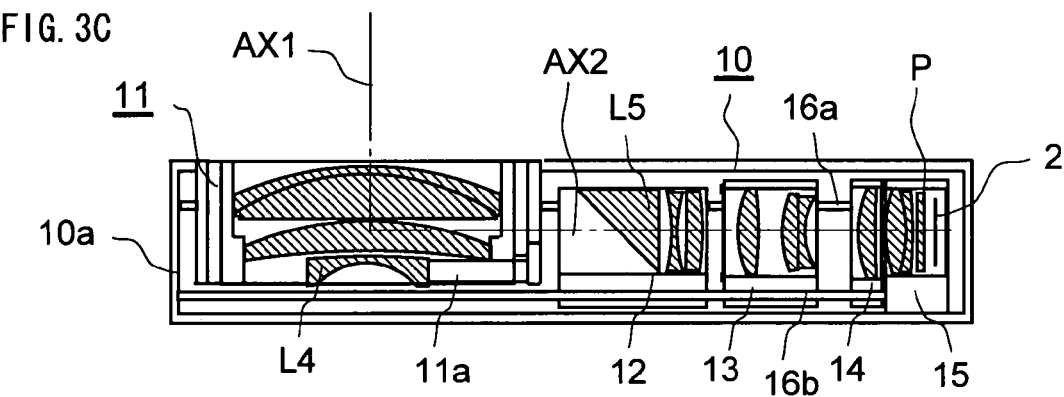

FIGS. 3A to 3C are sectional views showing arrangements of a lens barrel including the zoom lens system in the imaging device according to Embodiment 1. FIG. 3A is a sectional view showing an arrangement of the lens barrel in the imaging state at a telephoto limit. FIG. 3B is a sectional view showing an arrangement of the lens barrel in the imaging state at a wide-angle limit. FIG. 3C is a sectional view showing an arrangement of the lens barrel in the accommodated state.

The lens barrel of the imaging device according to Embodiment 1 comprises a main barrel 10, a first lens unit holding multi-stage barrel 11, a second lens unit holding barrel 12, a third lens unit holding barrel 13, a fourth lens unit holding barrel 14, a fifth lens unit holding barrel 15, a guide shaft 16a and a guide shaft 16b.

The main barrel 10 is a body capable of accommodating the entire construction of the imaging device in the accommodated state. In the imaging state shown in FIGS. 3A and 3B, the second lens unit holding barrel 12, the third lens unit holding barrel 13, the fourth lens unit holding barrel 14, the fifth lens unit holding barrel 15, the guide shaft 16a and the guide shaft 16b are located in the main barrel 10.

The first lens unit holding multi-stage barrel 11 is an expandable three-stage lens barrel. Draw-out and barrel escape along the optical axis AX1 are driven by a drive motor and a drive mechanism which are not shown. In the first lens unit holding multi-stage barrel 11, the first lens unit is held in a barrel having the smallest inner diameter. Further, a barrel having the largest inner diameter is provided with a holding section 11*a* for holding the negative meniscus lens element L4 located on the most object side in the second lens unit.

The second lens unit holding barrel 12 holds the components located on the image sensor side relative to the prism L5, among the second lens unit components. The third lens unit holding barrel 13 and the fourth lens unit holding barrel 14 hold the third lens unit and the fourth lens unit, respectively. The fifth lens unit holding barrel 15 holds the fifth lens unit, the plane parallel plate P and the image sensor 2.

The second lens unit holding barrel 12, the third lens unit holding barrel 13 and the fourth lens unit holding barrel 14 are guided on two guide shafts 16*a* and 16*b* arranged in parallel to the optical axis AX2, and held in a manner movable along the optical axis AX2. Further, the second lens unit holding barrel 12, the third lens unit holding barrel 13 and the fourth lens unit holding barrel 14 are driven along the optical axis AX2 by a drive motor and a drive mechanism which are not shown. In each of the guide shafts 16*a* and 16*b*, one end is held by the fifth lens unit holding barrel 15, while the other end is held at a top end 10*a* of the main barrel 10, so that the guide shafts are fixed.

As to the above construction, in the imaging state at a telephoto limit shown in FIG. 3A, in the lens barrel, the first lens unit holding multi-stage barrel 11 is drawn out along the optical axis AX1 to the maximum, while the interval between the first lens unit and the second lens unit is maintained at maximum. Further, the second lens unit holding barrel 12, the third lens unit holding barrel 13, the fourth lens unit holding barrel 14, and the fifth lens unit holding barrel 15 are arranged respectively at predetermined positions on the optical axis AX2 at a telephoto limit.

In transition from the imaging state at a telephoto limit shown in FIG. 3A to the imaging state at a wide-angle limit shown in FIG. 3B, the first lens unit holding multi-stage barrel 11 is shortened along the optical axis AX2 to the minimum length, and then stops at a position where the interval between the first lens unit and the second lens unit becomes minimum. At that time, during the shortening of the first lens unit holding multi-stage barrel 11, the lens element L4 held in the holding section 11*a* of the first lens unit holding multi-stage barrel 11 is fixed such that the interval with the prism L5 should not vary. Further, the third and fourth lens unit holding barrels 13 and 14 move along the optical axis AX2 in a manner guided by the guide shafts 16*a* and 16*b*, and then stop respectively at predetermined positions on the optical axis AX2 at a wide-angle limit. Here, during this time, the second lens unit holding barrel 12 and the fifth lens unit holding barrel 15 are fixed.

As shown in FIGS. 3A and 3B, in zooming from the wide-angle limit to the telephoto limit at the time of imaging, the interval does not vary between the lens element L4 held by the holding section 11*a* of the first lens unit holding multi-stage barrel 11 and the prism L5 held by the second lens unit holding barrel 12. Thus, the construction of the second lens unit located on the image sensor side relative to the prism L5 held by the second lens unit holding barrel 12 is fixed at a predetermined position on the optical axis AX2. That is, in zooming from the wide-angle limit to the telephoto limit at the time of imaging, the second lens unit does not move in the optical axis direction.

In transition from the imaging state at a wide-angle limit shown in FIG. 3B to the accommodated state shown in FIG. 3C, the third and fourth lens unit holding barrels 13 and 14 move along the optical axis AX2 in a manner guided by the guide shafts 16*a* and 16*b*, and then stop respectively at predetermined positions such as to form a space for accommodating the second lens unit holding barrel 12. During this movement, the fifth lens unit holding barrel 15 is fixed. Further, the second lens unit holding barrel 12 moves along the optical axis AX2, and thereby escape the lens elements except for the lens element L4 located on the most object side among the second lens unit components. After that, the first lens unit holding multi-stage barrel 11 is retracted along the optical axis AX1 with maintaining the minimum length, thereby accommodated into the main barrel 10, and then stops.

As described above, according to the zoom lens system of Embodiment 1, in the accommodated state, the lens element having a reflecting surface can escape to an escape position different from the position located in the imaging state. Thus, the air space generated in the imaging state can be used effectively, so that a zoom lens system having a large variable magnification ratio and a high magnification can be accommodated in a manner compact and thin in the optical axis direction of the axial light beam from the object.

Further, the zoom lens system according to Embodiment 1 includes a lens element having a reflecting surface for bending the light beam from the object and further bending the light beam into a horizontal direction, that is, a reflecting surface for bending by approximately 90° the axial principal ray from the object. Thus, in the imaging state, the zoom lens system can be constructed in a manner thin in the optical axis direction of the axial light beam from the object.

Further, the zoom lens system of Embodiment 1 includes: an object side lens unit located on the object side relative to the lens element having a reflecting surface; and an image side lens unit located on the image side relative to the lens element having a reflecting surface. Thus, even a complicated zoom lens system of high magnification that has a large amount of movement of the lens unit can be constructed in a manner compact and thin in the optical axis direction of the axial light beam from the object.

Further, according to the zoom lens system of Embodiment 1, the lens element having a reflecting surface escapes in a direction perpendicular to the not-reflected axial principal ray from the object. This permits a construction that the zoom lens system becomes thin in the optical axis direction of the axial light beam from the object. In particular, according to the zoom lens system of Embodiment 1, the escape of the lens element having a reflecting surface is performed to the image side of the zoom lens system. Thus, the air space generated in the imaging state can be used as an accommodation space for the lens element having a reflecting surface. This realizes a considerably compact accommodated state.

Further, the zoom lens system of Embodiment 1, in order from the object side to the image side, comprises: a first lens unit having positive optical power; a second lens unit having negative optical power; and subsequent lens units including at least one lens unit having positive optical power. Further, a lens element having a reflecting surface is arranged inside the second lens unit. Thus, the size can be reduced in the reflecting surface. In particular, the zoom lens system can be constructed in a manner thin in the optical axis direction of the axial light beam from the object. Further, the size can be reduced in the precise lens element having a reflecting surface. This reduces the cost of the zoom lens system.

In particular, according to the zoom lens system of Embodiment 1, in the accommodated state, the negative meniscus lens element is separated from the lens element having a reflecting surface and does not escape. This avoids the necessity that the negative meniscus lens element which has intense optical power and hence high decentration sensitivity is moved from the optical axis. Thus, in the transition from the accommodated state to the imaging state, restoration is achieved in a state that the relative spatial arrangement is maintained between the first lens unit and the negative meniscus lens element.

Here, in general, the zoom lens system according to Embodiment 1 is accommodated into the lens barrel in the state shown in FIG. 3C. In this case, the zoom lens system can be constructed in an especially compact and thin manner in the optical axis direction of the axial light beam from the object. Alternatively, the accommodated state may be adopted such that transition from the state of telephoto limit shown in FIG. 3A to the state of wide-angle limit shown in FIG. 3B has been completed so that the first lens unit holding multi-stage barrel is shortened to the minimum length and then stops at a position where the interval between the first lens unit and the second lens unit becomes minimum. In this case, for example, the time from power start-up of the imaging device to photographing can be shortened.

Figure 4A:
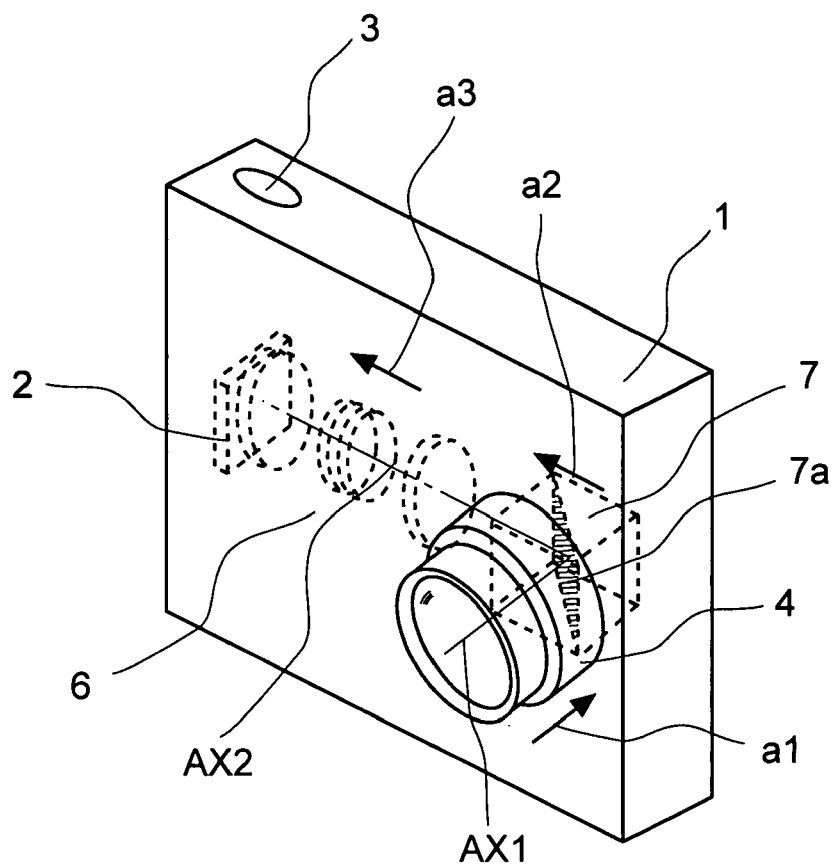
FIG. 4A is a transparent perspective view showing an outline configuration of an imaging state of a camera employing an imaging device according to a modification of Embodiment 1.
Figure 4B:
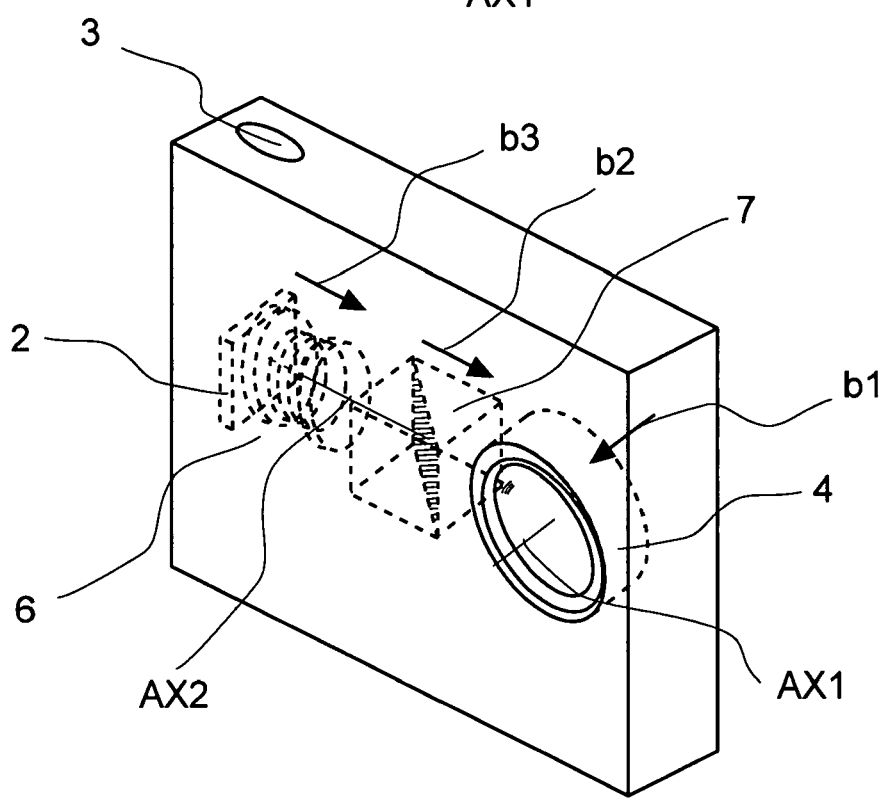
FIG. 4B is a transparent perspective view showing an outline configuration of an accommodated state of a camera employing an imaging device according to a modification of Embodiment 1.

FIG. 4A is a transparent perspective view showing a diagrammatic construction in an imaging state of a camera employing an imaging device according to a modification of Embodiment 1. FIG. 4B is a transparent perspective view showing a diagrammatic construction in an accommodated state of a camera employing an imaging device according to the modification of Embodiment 1. In FIGS. 4A and 4B, the same components as Embodiment 1 are designated by the same numerals. Then, their description is omitted.

The imaging device according to the modification is different from the imaging device according to Embodiment 1 described in FIGS. 1A to 1B, 2A to 2B and 3A to 3C in the point that the lens element 7 having a reflecting surface 7a has a cube shape. As such, the embodiment of the lens element having a reflecting surface is not limited to a specific one. However, a prism such as a surface reflection prism is preferred. Further, the reflecting surface may be fabricated by any one of known methods including: vapor deposition of metal such as aluminum; and forming of a dielectric multilayer film. Further, the reflecting surface need not have a reflectance of 100%. Thus, the reflectance may be appropriately adjusted when light for photometry or for an optical finder system need be extracted from the object light, or alternatively when the reflecting surface is used as part of an optical path for projecting auto-focusing auxiliary light or the like through itself.

Here, also for the lens barrel employed in the camera shown in FIGS. 4A and 4B, similarly to the above case, the accommodated state may be adopted such that the transition has been completed from the state of telephoto limit to the state of wide-angle limit so that the first lens unit holding multi-stage barrel is shortened to the minimum length and then stops at a position where the interval between the first lens unit and the second lens unit becomes minimum.

Embodiment 2

Figure 5A:
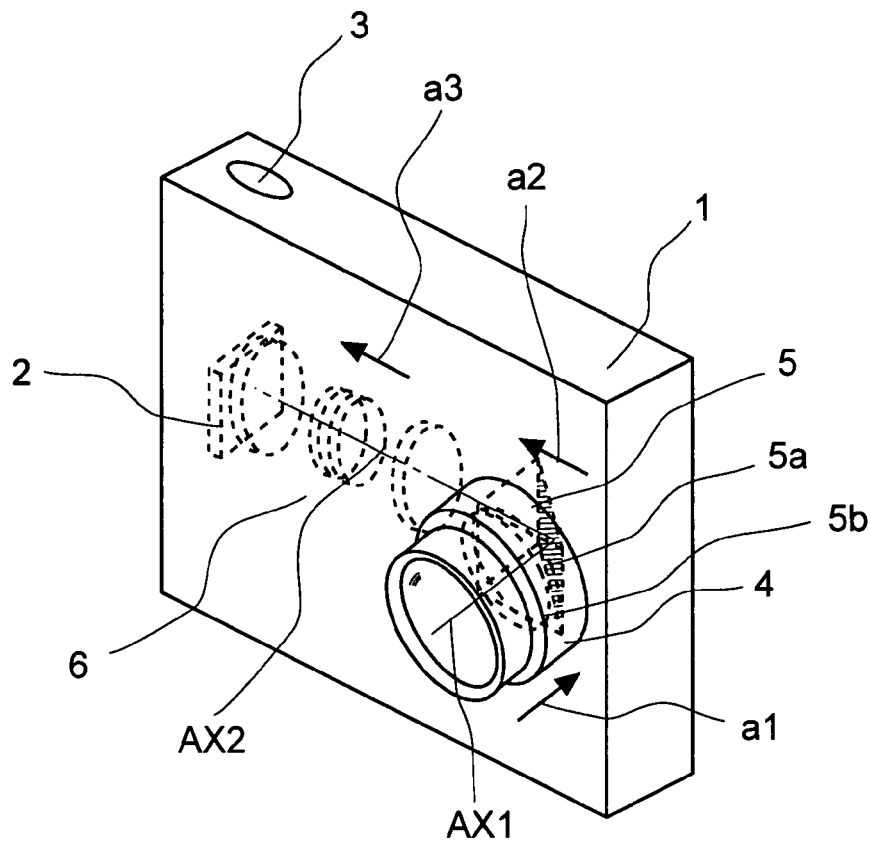
FIG. 5A is a transparent perspective view showing an outline configuration in an imaging state of a camera employing an imaging device according to Embodiment 2.
Figure 5B:
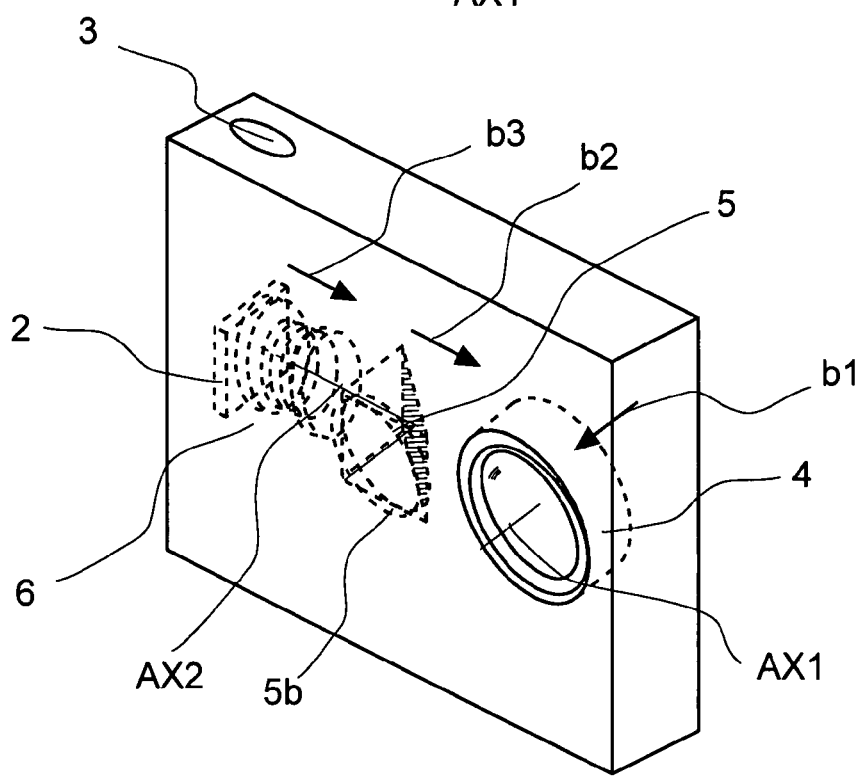
FIG. 5B is a transparent perspective view showing an outline configuration in an accommodated state of a camera employing an imaging device according to Embodiment 2.

FIG. 5A is a transparent perspective view showing an outline configuration in the imaging state of a camera employing the imaging device according to Embodiment 2. FIG. 5B is a transparent perspective view showing an outline configuration in the accommodated state of a camera employing the imaging device according to Embodiment 2. In FIGS. 5A and 5B, the same components as Embodiment 1 are designated by the same numerals. Then, their description is omitted.

The imaging device according to Embodiment 2 is different from the imaging device according to Embodiment 1 in the point that the block escaping in the accommodated state includes a lens element 5b arranged on the object side relative to the lens element 5 having a reflecting surface.

In transition from the imaging state shown in FIG. 5A to the accommodated state shown in FIG. 5B, the image side lens unit 6 first moves toward the image sensor 2 along the optical axis AX2 as indicated by an arrow a3. Then, the lens element 5 having a reflecting surface and the lens element 5b move toward the image sensor 2 along the optical axis AX2 as indicated by an arrow a2. Finally, the lens holding barrel that holds the object side lens unit 4 is retracted along the optical axis AX1 as indicated by an arrow a1 into a space formed by the movement of the image side lens unit 6, the lens element 5 having a reflecting surface, and the lens element 5b. As a result, the transition to the accommodated state is completed.

On the contrary, in transition from the accommodated state shown in FIG. 5B to the imaging state shown in FIG. 5A, the lens holding barrel for holding the object side lens unit 4 is drawn out along the optical axis AX1 as indicated by an arrow b1. The lens element 5 having a reflecting surface and the lens element 5b move along the optical axis AX2 as indicated by an arrow b2 into the space formed by the draw-out of the lens holding barrel for holding the object side lens unit 4. Further, the image side lens unit 6 moves along the optical axis AX2 as indicated by an arrow b3, so that the transition to the imaging state is completed.

Figure 6A:
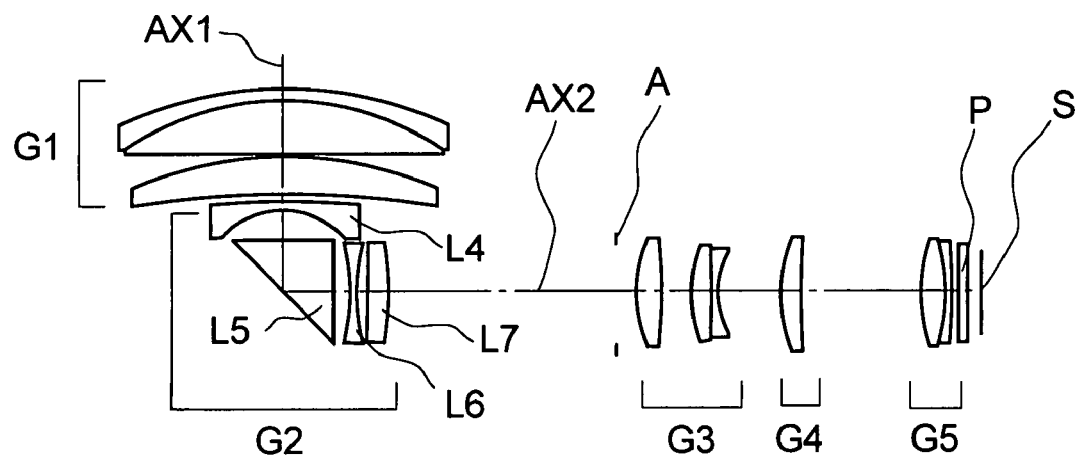
FIG. 6A is a lens arrangement diagram showing an arrangement of an imaging optical system in an imaging state at a wide-angle limit in Embodiment 2.
Figure 6B:
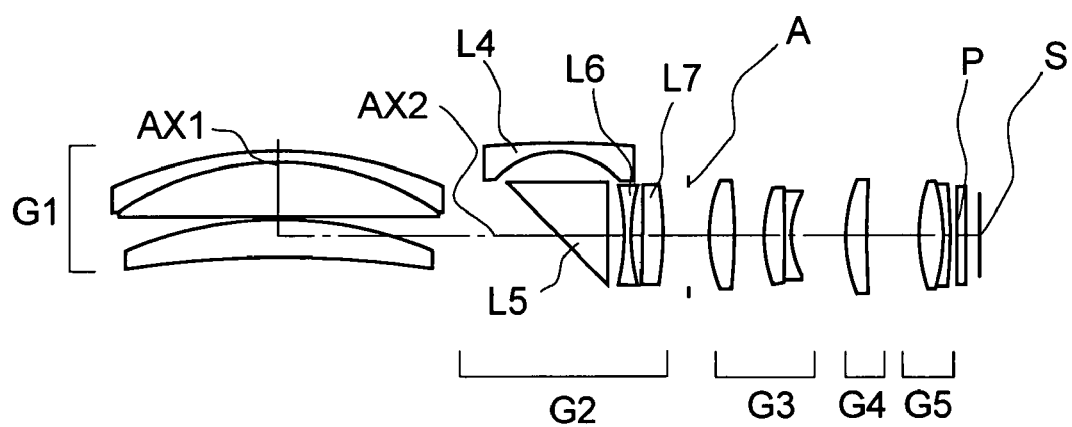
FIG. 6B is a lens arrangement diagram showing an arrangement of an imaging optical system in an accommodated state in Embodiment 2.

FIG. 6A is a lens arrangement diagram showing an arrangement of the zoom lens system in the imaging state at a wide-angle limit in Embodiment 2. FIG. 6B is a lens arrangement diagram showing an arrangement of the zoom lens system in the accommodated state in Embodiment 2. The zoom lens system according to Embodiment 2 has the same construction as the zoom lens system described in Embodiment 1. The zoom lens system, in order from the object side to the image side, comprises: a first lens unit G1 having positive optical power; a second lens unit G2 having negative optical power; and subsequently a diaphragm A, a third lens unit G3, a fourth lens unit G4 and a fifth lens unit G5. Further, a straight line drawn on the right most side in the figure indicates the position of an image surface S. On its object side, a plane parallel plate P such as an optical low-pass filter, a face plate of the image sensor or the like is provided. A prism L5 serving as a lens element having a reflecting surface is arranged inside the second lens unit G2.

In the zoom lens system according to Embodiment 2, in the accommodated state shown in FIG. 6B, the entirety of the second lens unit G2, that is, construction including the negative meniscus lens element L4 located on the most object side, the prism L5 serving as a lens element having a reflecting surface and the subsequent lens elements L6 and L7, escapes integrally.

Figure 7A:
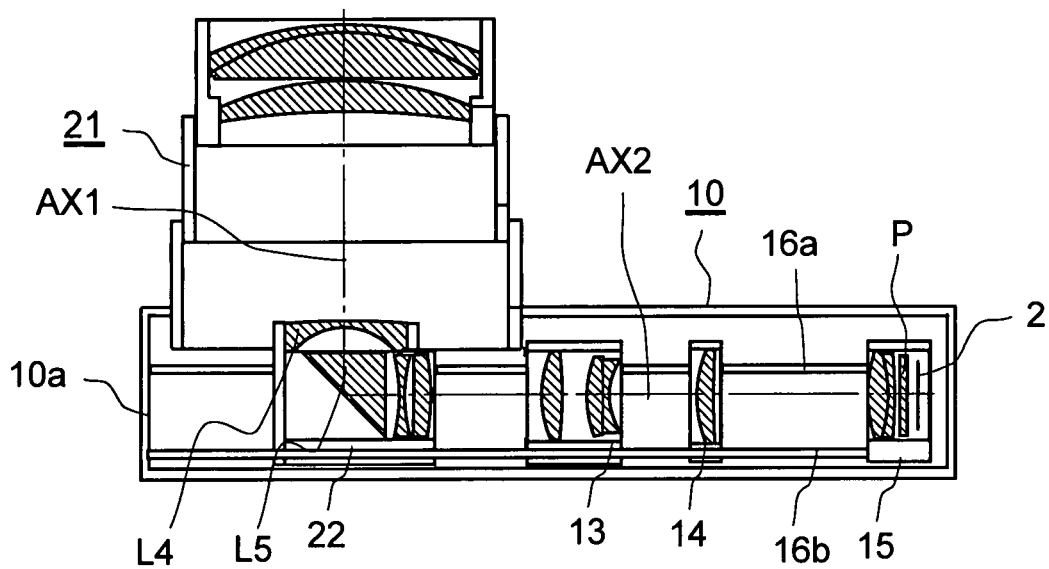
FIGS. 7A to 7C are sectional views showing arrangements of a lens barrel of an imaging device according to Embodiment 2 respectively in an imaging state at a telephoto limit, in an imaging state at a wide-angle limit and in an accommodated state.
Figure 7B:
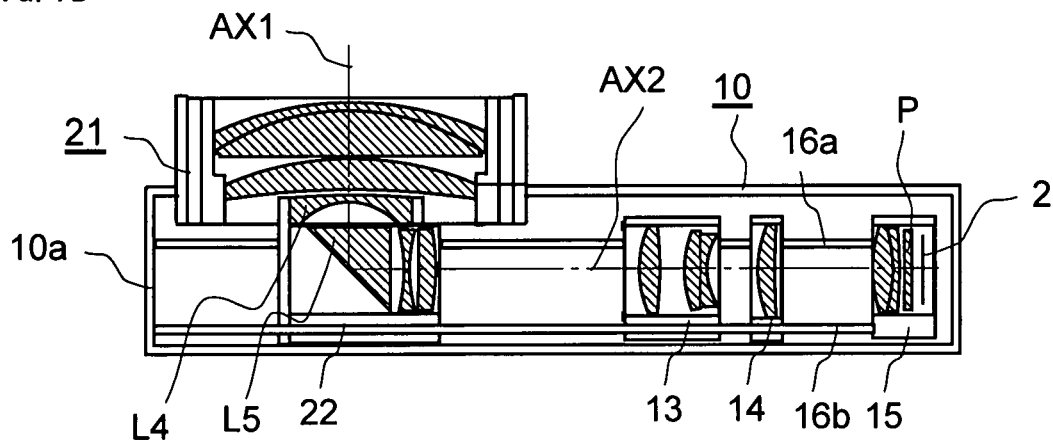
Figure 7C:
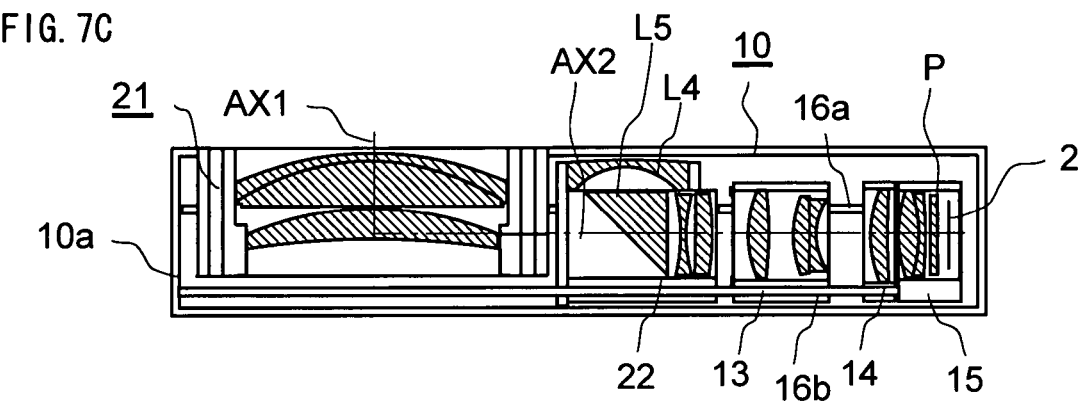

FIGS. 7A to 7C are sectional views showing arrangements of a lens barrel including the zoom lens system in the imaging device according to Embodiment 2. FIG. 7A is a sectional view showing an arrangement of the lens barrel in the imaging state at a telephoto limit. FIG. 7B is a sectional view showing an arrangement of the lens barrel in the imaging state at a wide-angle limit. FIG. 7C is a sectional view showing an arrangement of the lens barrel in the accommodated state. The lens barrel in Embodiment 2 is different from Embodiment 1 in the point that a second lens unit holding barrel 22 holds the entirety of the second lens unit from the lens element L4 via the prism L5 to the two subsequent lens elements.

In Embodiment 2, in transition from the imaging state at a telephoto limit shown in FIG. 7A to the imaging state at a wide-angle limit shown in FIG. 7B, operation is performed similarly to Embodiment 1. On the other hand, in transition from the imaging state at a wide-angle limit shown in FIG. 7B to the accommodated state shown in FIG. 7C, the second lens unit holding barrel 22 moves along the optical axis AX2, and thereby escapes the entire second lens unit. After that, a first lens unit holding multi-stage barrel 21 is retracted along the optical axis AX1 with maintaining the minimum length, thereby accommodated into the main barrel 10, and then stopped.

As shown in FIGS. 7A and 7B, in zooming from the wide-angle limit to the telephoto limit at the time of imaging, the entirety from the lens element L4 via the prism L5 to the two subsequent lens elements held by the second lens unit holding barrel 22 is fixed at a predetermined position on the optical axis AX2. That is, in zooming from the wide-angle limit to the telephoto limit at the time of imaging, the second lens unit does not move in the optical axis direction.

As described above, according to the zoom lens system of Embodiment 2, in addition to the common construction described in Embodiment 1, in the accommodated state, the entire second lens unit escapes together with the lens element having a reflecting surface. Thus, in the transition from the accommodated state to the imaging state, restoration is achieved in a state that the relative positional relation is maintained in the second lens unit. This improves restoration accuracy.

Here, also for the lens barrel shown in FIGS. 7A to 7C, similarly to the above case, the accommodated state may be the state of FIG. 7B where the transition has been completed from the state of telephoto limit to the state of wide-angle limit so that the first lens unit holding multi-stage barrel is shortened to the minimum length and then stops at a position where the interval between the first lens unit and the second lens unit becomes minimum.

Embodiment 3

Figure 8A:
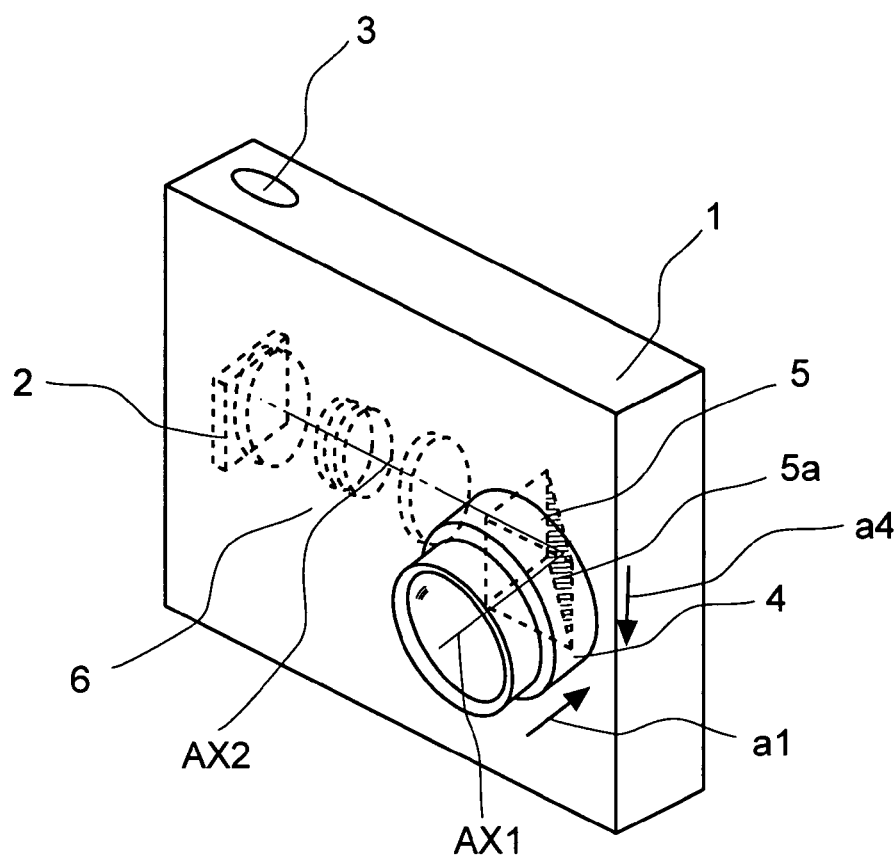
FIG. 8A is a transparent perspective view showing an outline configuration in an imaging state of a camera employing an imaging device according to Embodiment 3.
Figure 8B:
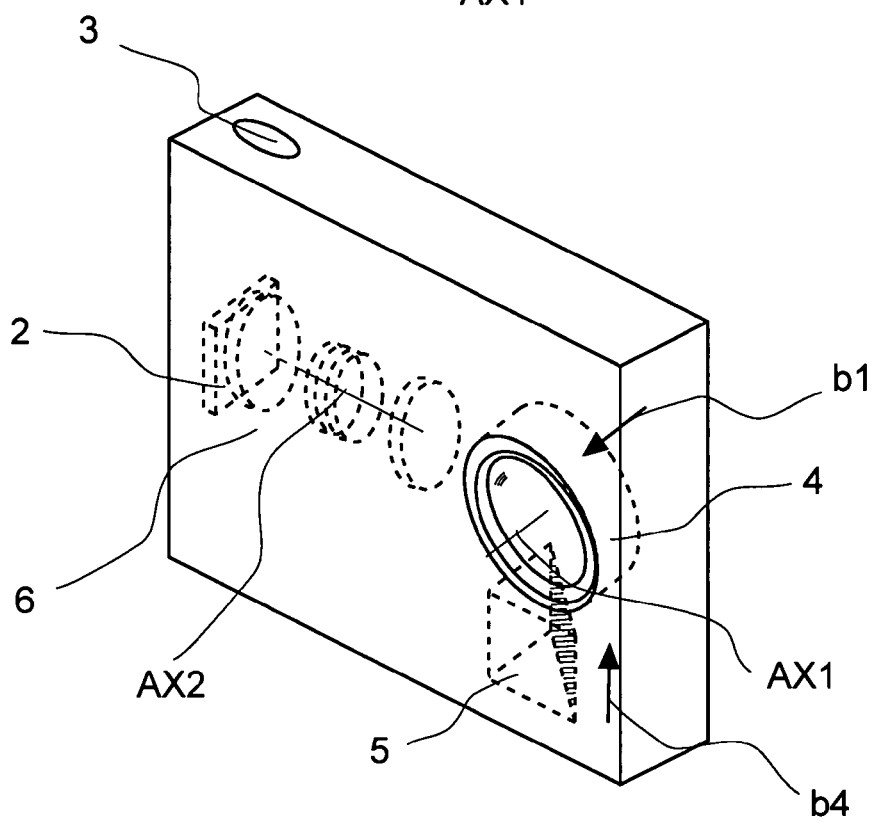
FIG. 8B is a transparent perspective view showing an outline configuration in an accommodated state of a camera employing an imaging device according to Embodiment 3.

FIG. 8A is a transparent perspective view showing an outline configuration in the imaging state of a camera employing the imaging device according to Embodiment 3. FIG. 8B is a transparent perspective view showing an outline configuration in the accommodated state of a camera employing the imaging device according to Embodiment 3. In FIGS. 8A and 8B, the same components as Embodiment 1 are designated by the same numerals. Then, their description is omitted.

The imaging device according to Embodiment 3 is different from the imaging device according to Embodiment 1 in the point that in the accommodated state, a block escapes not in the direction of the optical axis AX2 of the image side lens unit 6 but in a direction perpendicular to the optical axis AX2.

In transition from the imaging state shown in FIG. 8A to the accommodated state shown in FIG. 8B, the lens element 5 having a reflecting surface first moves in a direction perpendicular to the optical axis AX2 as indicated by an arrow a4. Then, the lens holding barrel for holding the object side lens unit 4 is retracted along the optical axis AX1 as indicated by an arrow a1 into a space formed by the movement of the lens element 5 having a reflecting surface. As a result, the transition to the accommodated state is completed.

On the contrary, in transition from the accommodated state shown in FIG. 8B to the imaging state shown in FIG. 8A, the lens holding barrel for holding the object side lens unit 4 is drawn out along the optical axis AX1 as indicated by an arrow b1. Then, the lens element 5 having a reflecting surface moves in a direction perpendicular to the optical axis AX2 as indicated by an arrow b4, and enters into a space formed by the draw-out of the lens holding barrel for holding the object side lens unit 4. As a result, the transition to the imaging state is completed.

As described above, in the zoom lens system according to Embodiment 3, in addition to the common construction described in Embodiment 1, the lens element having a reflecting surface escapes in a direction perpendicular to the optical axis AX2. Thus, the image side lens unit need not move at the time of transition to the accommodated state. This simplifies the mechanism and allows the zoom lens system to be constructed compactly in the optical axis AX2 direction.

Here, also in the lens barrel employed in the camera shown in FIGS. 8A to 8B, similarly to the above case, the accommodated state may be adopted such that the transition has been completed from the state of telephoto limit to the state of wide-angle limit so that the first lens unit holding multi-stage barrel is shortened to the minimum length and then stops at a position where the interval between the first lens unit and the second lens unit becomes minimum.

Embodiment 4

Figure 9A:
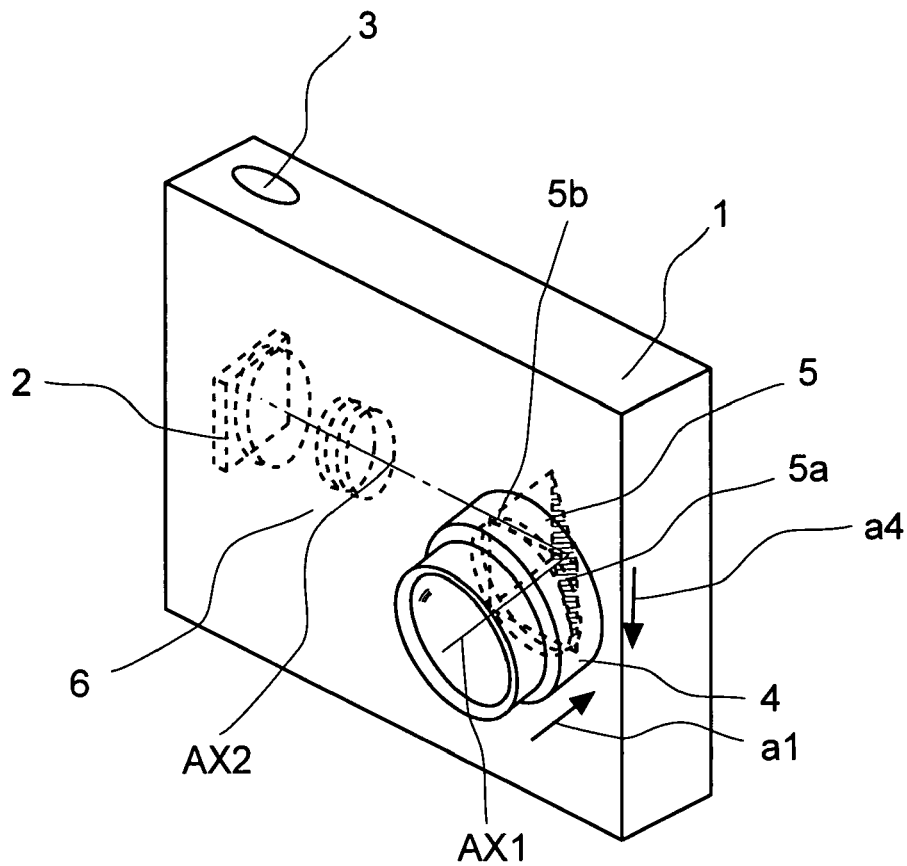
FIG. 9A is a transparent perspective view showing an outline configuration in an imaging state of a camera employing an imaging device according to Embodiment 4.
Figure 9B:
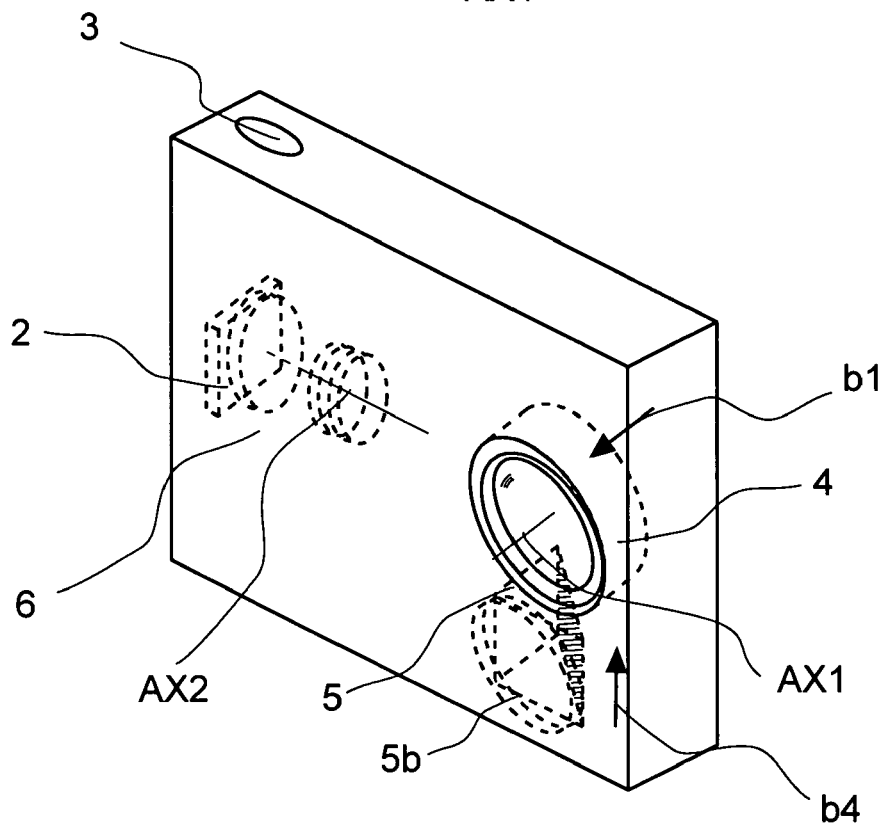
FIG. 9B is a transparent perspective view showing an outline configuration in an accommodated state of a camera employing an imaging device according to Embodiment 4.

FIG. 9A is a transparent perspective view showing an outline configuration in the imaging state of a camera employing the imaging device according to Embodiment 4. FIG. 9B is a transparent perspective view showing an outline configuration in the accommodated state of a camera employing the imaging device according to Embodiment 4. In FIGS. 9A and 9B, the same components as Embodiment 2 are designated by the same numerals. Then, their description is omitted.

The imaging device according to Embodiment 4 is different from the imaging device according to Embodiment 2 in the point that in the accommodated state, a block escapes not in the direction of the optical axis AX2 of the image side lens unit 6 but in a direction perpendicular to the optical axis AX2.

In transition from the imaging state shown in FIG. 9A to the accommodated state shown in FIG. 9B, the lens element 5 having a reflecting surface and the lens element 5b first move in a direction perpendicular to the optical axis AX2 as indicated by an arrow a4. Then, the lens holding barrel that holds the object side lens unit 4 is retracted along the optical axis AX1 as indicated by an arrow a1 into a space formed by the movement of the lens element 5 having a reflecting surface and the lens element 5b. As a result, the transition to the accommodated state is completed.

On the contrary, in transition from the accommodated state shown in FIG. 9B to the imaging state shown in FIG. 9A, the lens holding barrel for holding the object side lens unit 4 is drawn out along the optical axis AX1 as indicated by an arrow b1. Then, the lens element 5 having a reflecting surface and the lens element 5b move in a direction perpendicular to the optical axis AX2 as indicated by an arrow b4, and enter into a space formed by the draw-out of the lens holding barrel that holds the object side lens unit 4. As a result, the transition to the imaging state is completed.

As described above, in the lens barrel according to Embodiment 4, in addition to the common construction described in Embodiment 2, the lens element having a reflecting surface escapes in a direction perpendicular to the optical axis AX2. Thus, the image side lens unit need not move at the time of transition to the accommodated state.

This simplifies the mechanism and allows the zoom lens system to be constructed compactly in the optical axis AX2 direction.

Here, also in the lens barrel employed in the camera shown in FIGS. 9A to 9B, similarly to the above case, the accommodated state may be adopted such that the transition has been completed from the state of telephoto limit to the state of wide-angle limit so that the first lens unit holding multi-stage barrel is shortened to the minimum length and then stops at a position where the interval between the first lens unit and the second lens unit becomes minimum.

Embodiment 5

Figure 10A:
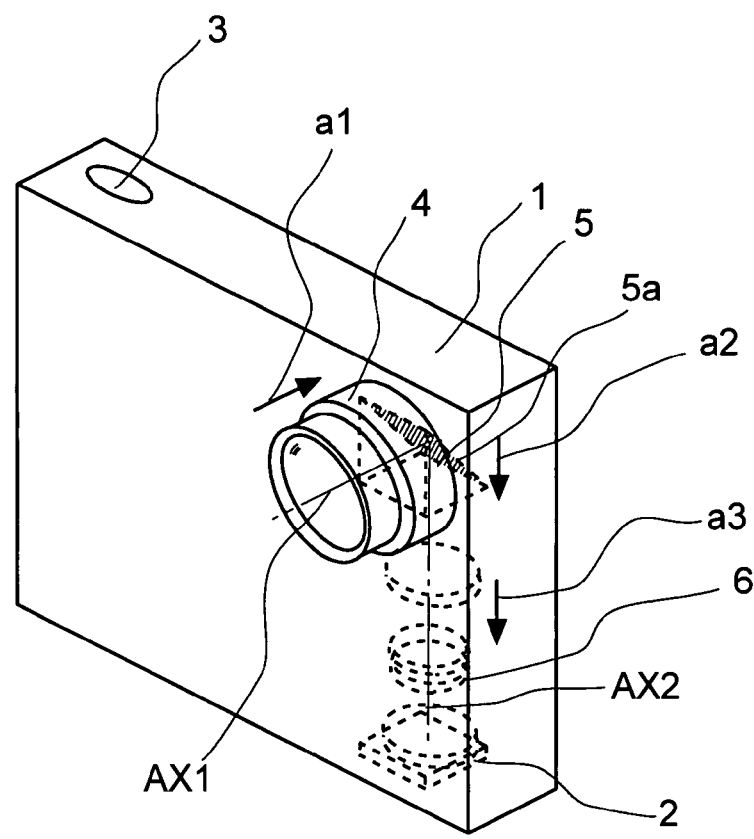
FIG. 10A is a transparent perspective view showing an outline configuration in an imaging state of a camera employing an imaging device according to Embodiment 5.
Figure 10B:
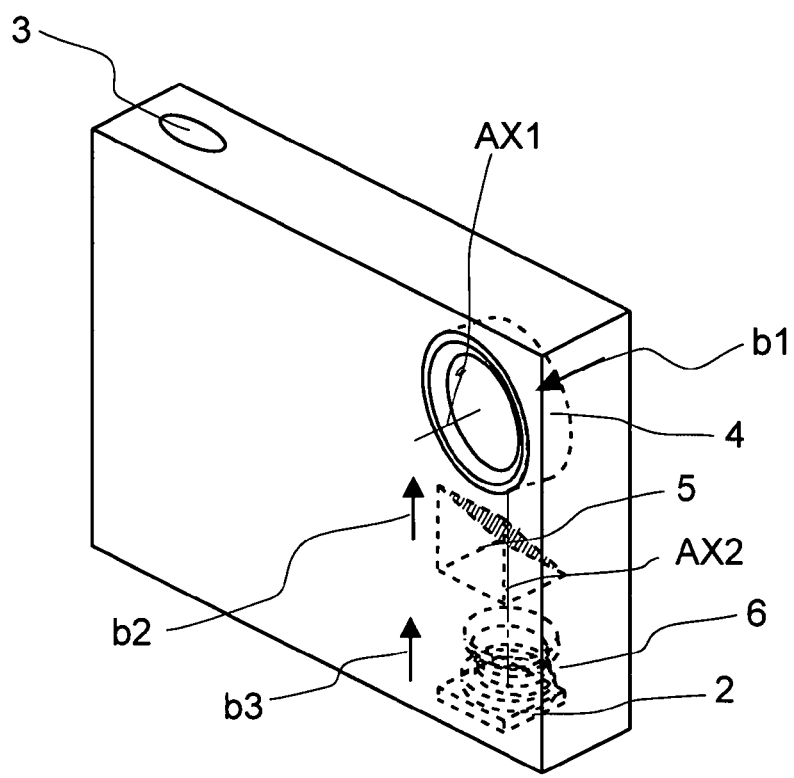
FIG. 10B is a transparent perspective view showing an outline configuration in an accommodated state of a camera employing an imaging device according to Embodiment 5.

FIG. 10A is a transparent perspective view showing an outline configuration in the imaging state of a camera employing the imaging device according to Embodiment 5. FIG. 10B is a transparent perspective view showing an outline configuration in the accommodated state of a camera employing the imaging device according to Embodiment 5. In FIGS. 10A and 10B, the same components as Embodiment 1 are designated by the same numerals. Then, their description is omitted.

The imaging device according to Embodiment 5 is the same as the imaging device according to Embodiments 1 to 4. However, the arrangement direction layout of the optical axis AX2 is different at the time of arranging in the camera. That is, in the camera employing the imaging device according to Embodiments 1 to 4, the optical axis AX2 has been arranged perpendicularly to the stroke direction of the shutter button 3, so that the imaging device has been arranged horizontally. In contrast, in the camera employing the imaging device according to Embodiment 5, the optical axis AX2 is arranged in parallel to the stroke direction of the shutter button 3, so that the imaging device is arranged vertically.

As such, in the imaging device according to Embodiment 5, arrangement flexibility is increased when the imaging device is applied to the camera, and so is the flexibility in designing of a camera.

Here, also in the lens barrel employed in the camera shown in FIGS. 10A to 10B, similarly to the above case, the accommodated state may be adopted such that the transition has been completed from the state of telephoto limit to the state of wide-angle limit so that the first lens unit holding multi-stage barrel is shortened to the minimum length and then stops at a position where the interval between the first lens unit and the second lens unit becomes minimum.

Embodiments 6 to 10

Figure 11A:
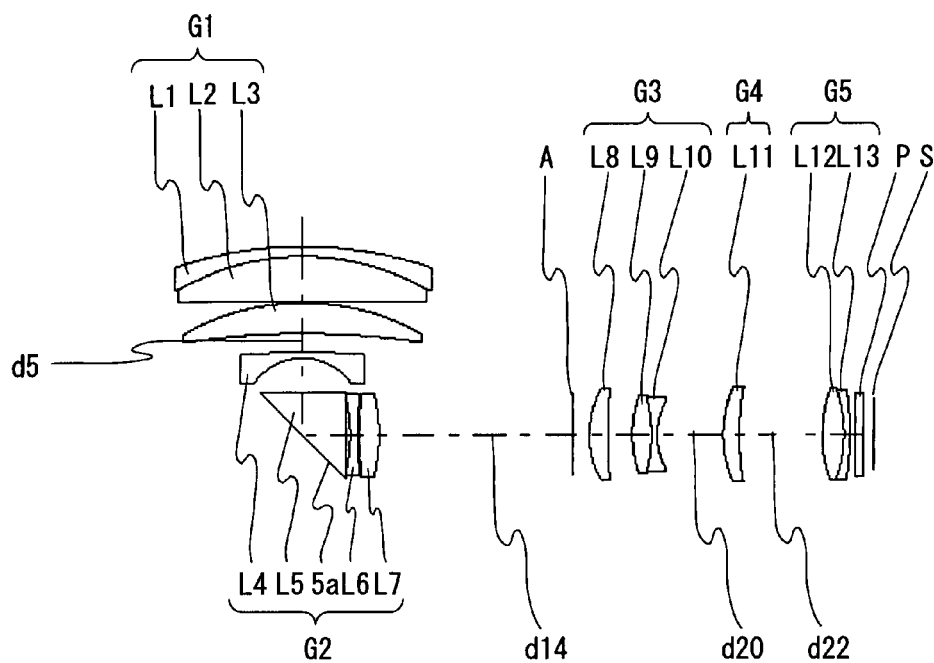
FIGS. 11A to 11C are lens arrangement diagrams showing a zoom lens system according to Embodiment 6 (Example 1) in an infinity in-focus condition at a wide-angle limit, a middle position and a telephoto limit.
Figure 11B:
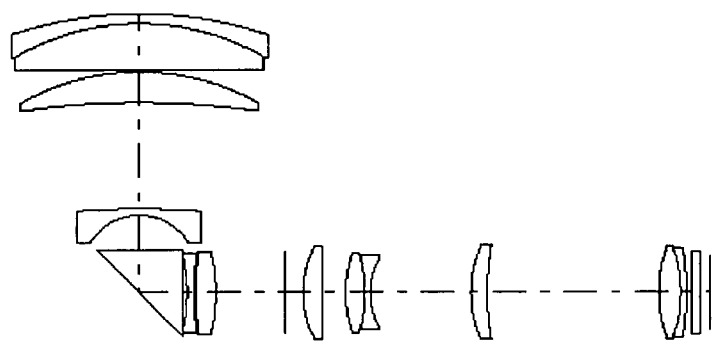
Figure 11C:
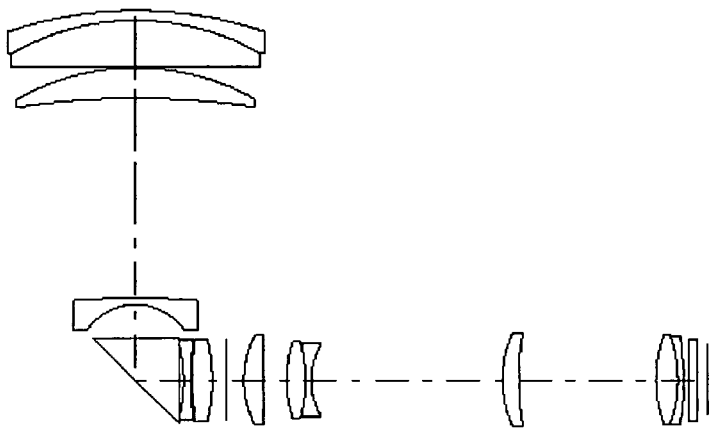
Figure 14A:
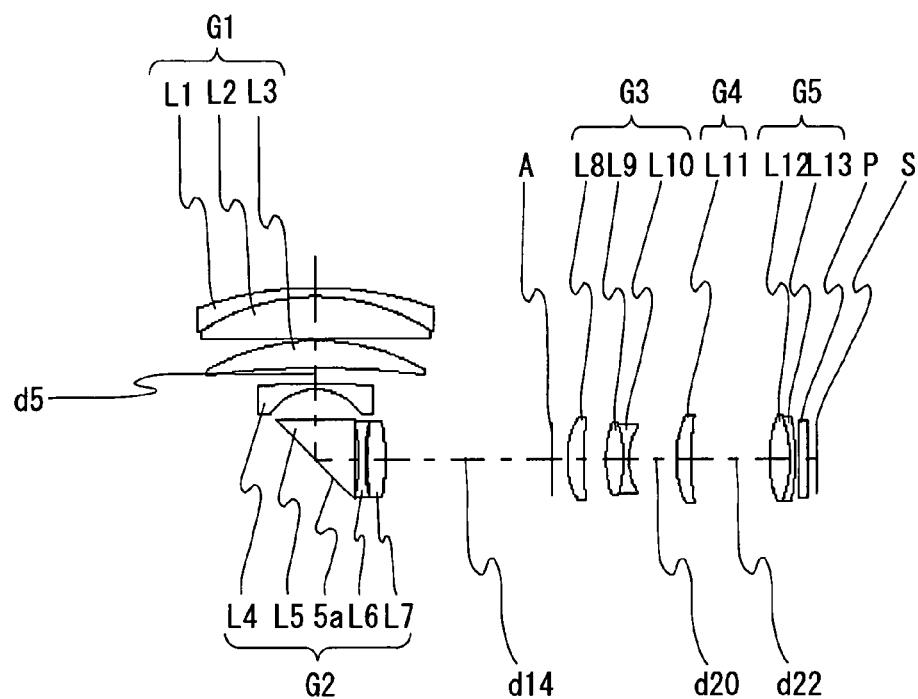
FIGS. 14A to 14C are lens arrangement diagrams showing a zoom lens system according to Embodiment 7 (Example 2) in an infinity in-focus condition at a wide-angle limit, a middle position and a telephoto limit.
Figure 14B:
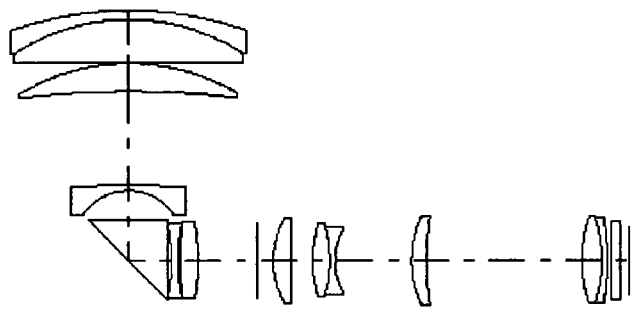
Figure 14C:
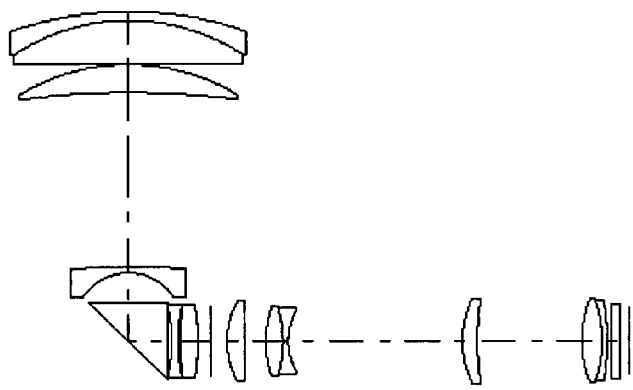
Figure 16A:
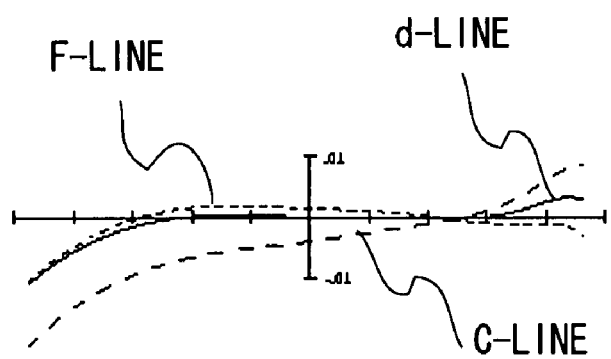
FIGS. 16A to 16F are lateral aberration diagrams of a zoom lens system according to Example 2 at a telephoto limit.
Figure 16B:
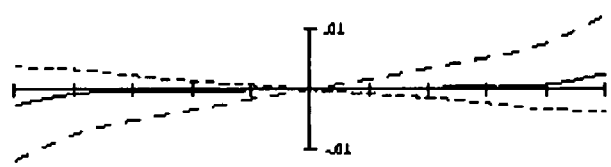
Figure 16C:
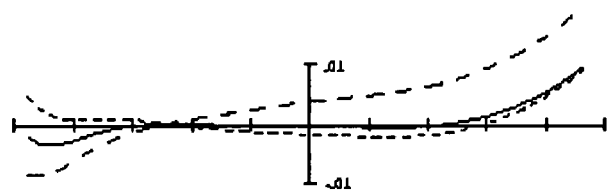
Figure 16D:
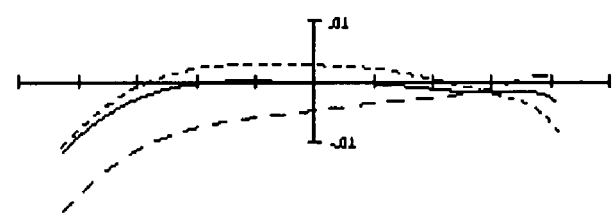
Figure 16E:
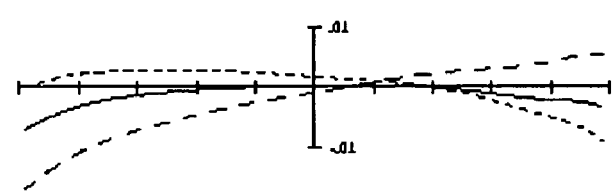
Figure 16F:
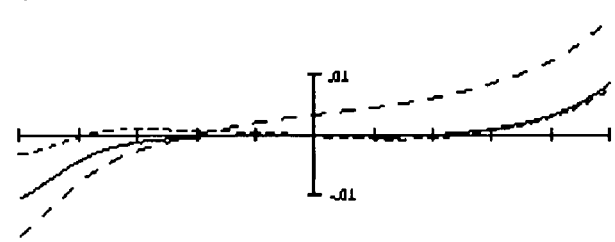
Figure 17A:
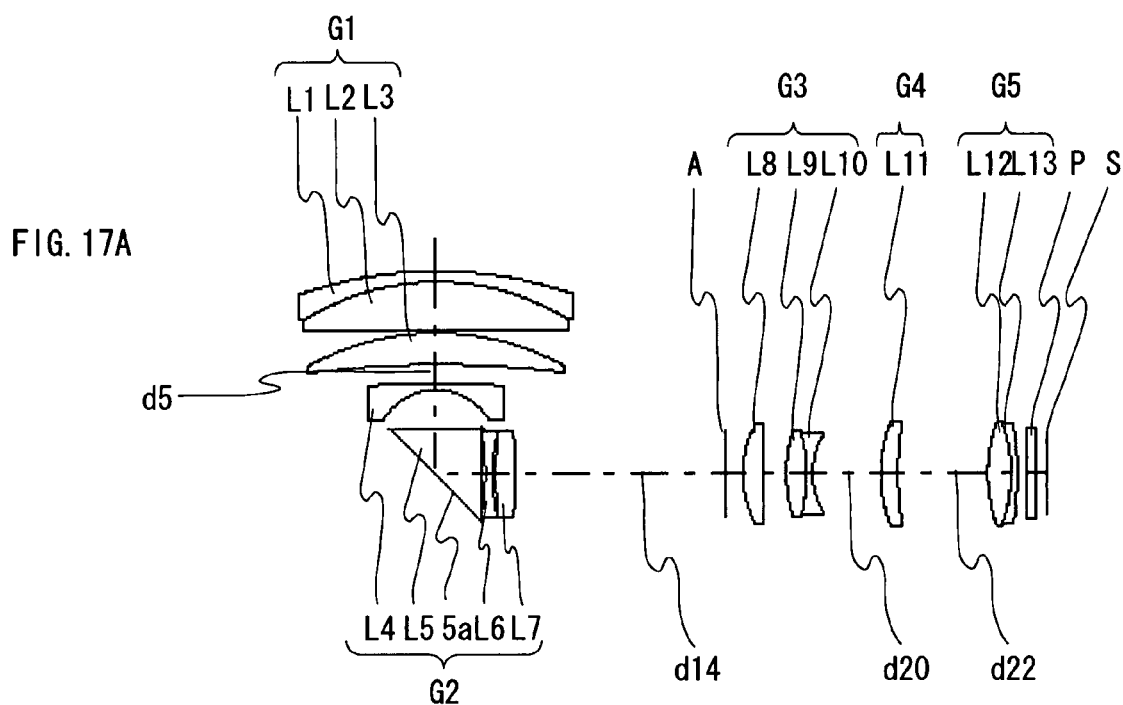
FIGS. 17A to 17C are lens arrangement diagrams showing a zoom lens system according to Embodiment 8 (Example 3) in an infinity in-focus condition at a wide-angle limit, a middle position and a telephoto limit.
Figure 17B:
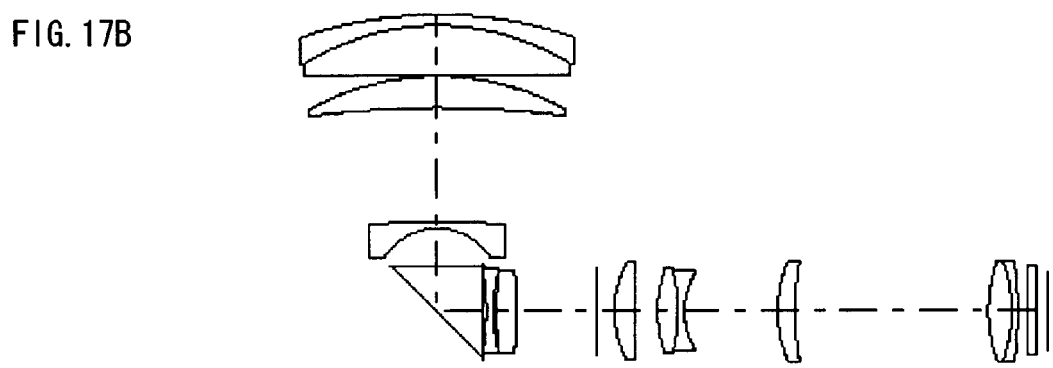
Figure 17C:
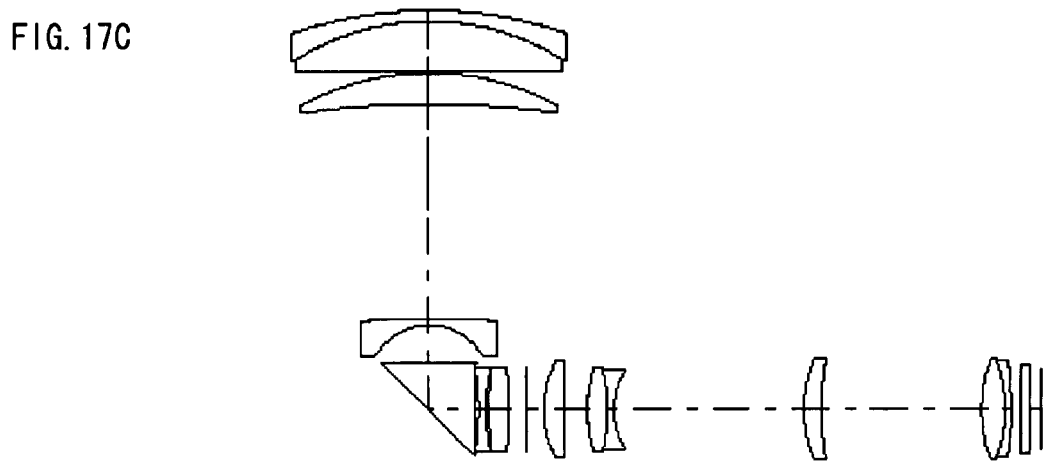
Figure 18A:
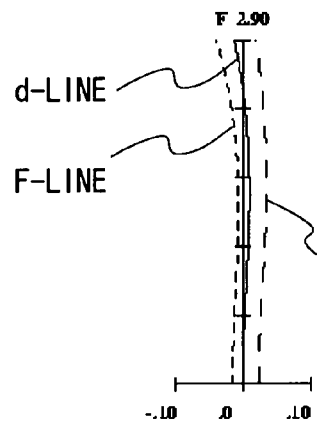
FIGS. 18A to 18I are longitudinal aberration diagrams of a zoom lens system according to Example 3 in an infinity in-focus condition at a wide-angle limit, a middle position and a telephoto limit.
Figure 18B:
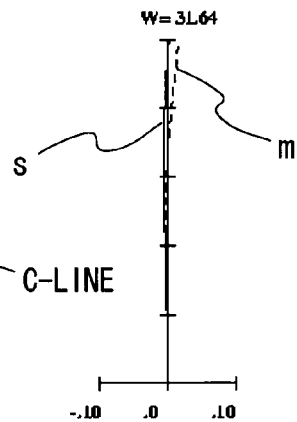
Figure 18C:
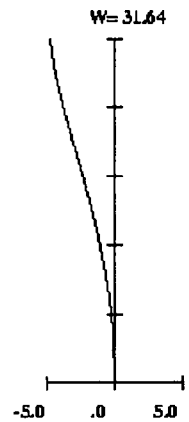
Figure 18D:
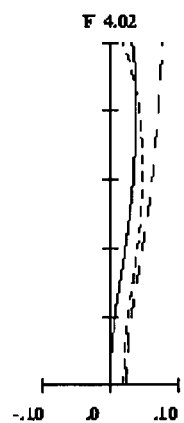
Figure 18E:
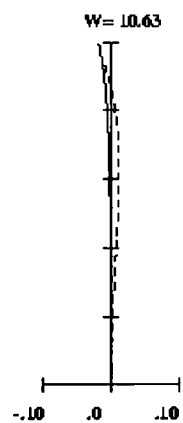
Figure 18F:
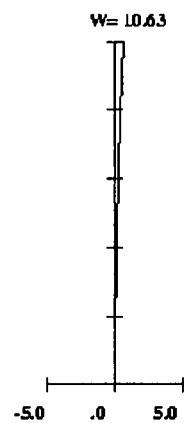
Figure 18G:
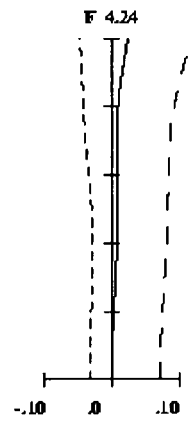
Figure 18H:
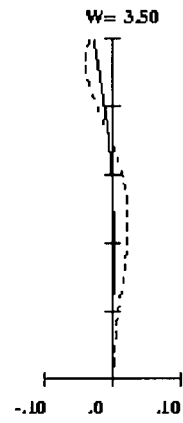
Figure 18I:
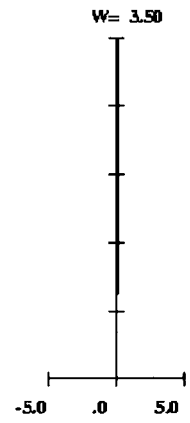
Figure 19A:
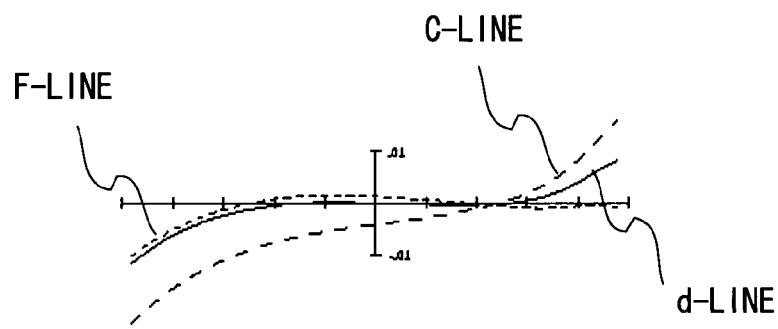
FIGS. 19A to 19F are lateral aberration diagrams of a zoom lens system according to Example 3 at a telephoto limit.
Figure 19B:
Figure 19C:
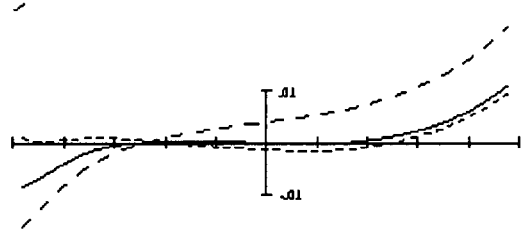
Figure 19D:
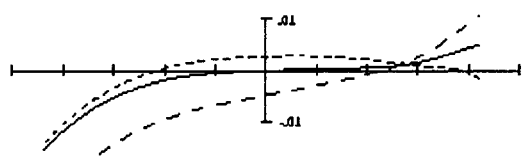
Figure 19E:
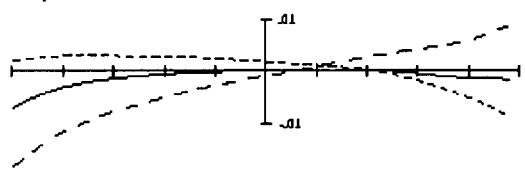
Figure 19F:
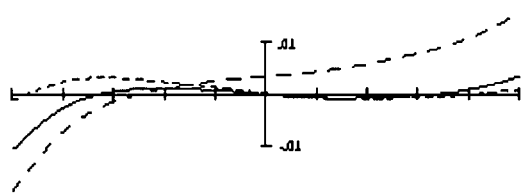
Figure 20A:
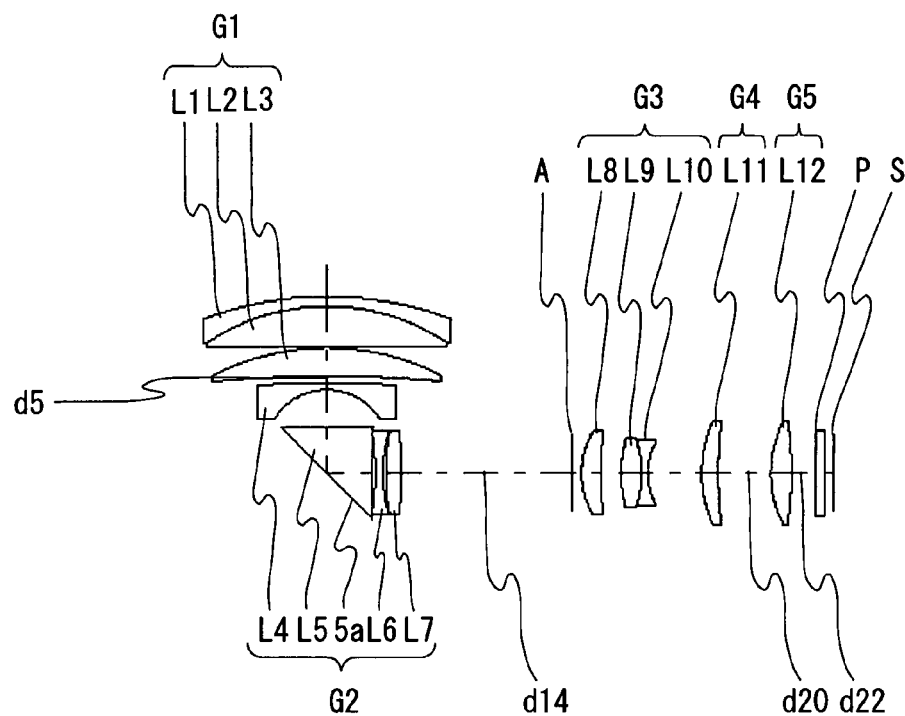
FIGS. 20A to 20C are lens arrangement diagrams showing a zoom lens system according to Embodiment 9 (Example 4) in an infinity in-focus condition at a wide-angle limit, a middle position and a telephoto limit.
Figure 20B:
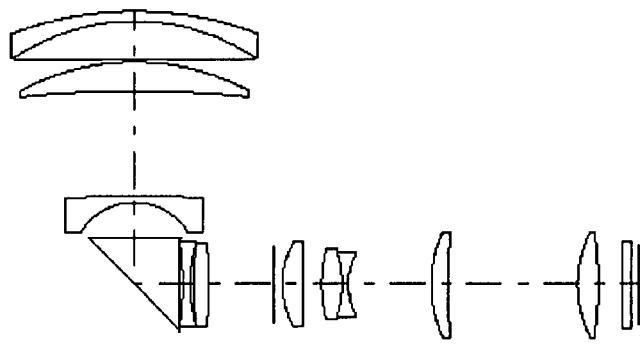
Figure 20C:
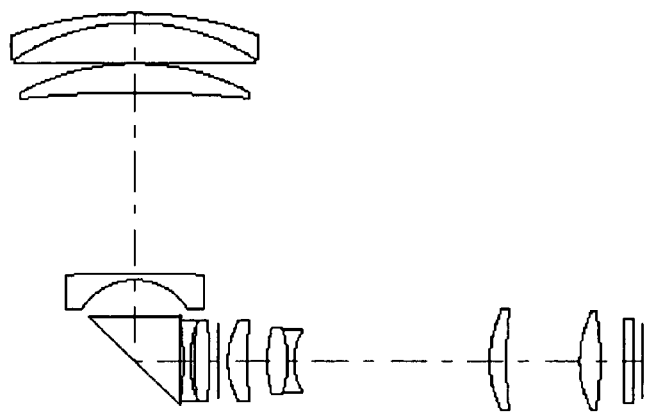
Figure 21A:
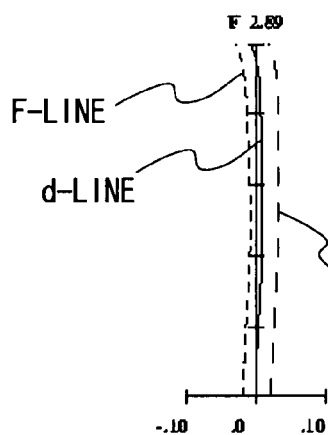
FIGS. 21A to 21I are longitudinal aberration diagrams of a zoom lens system according to Example 4 in an infinity in-focus condition at a wide-angle limit, a middle position and a telephoto limit.
Figure 21B:
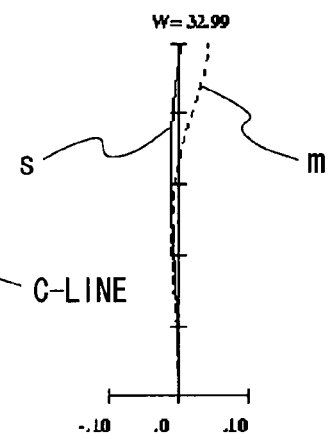
Figure 21C:
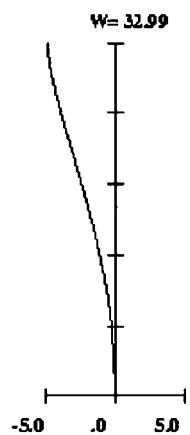
Figure 21D:
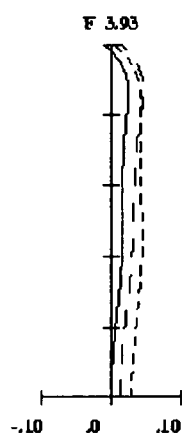
Figure 21E:
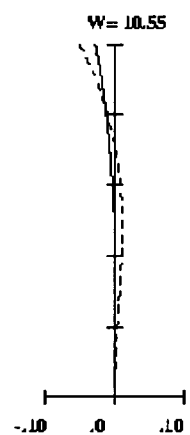
Figure 21F:
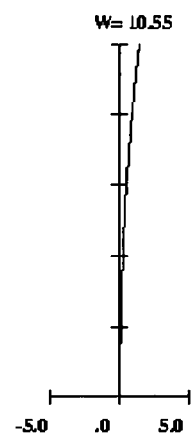
Figure 21G:
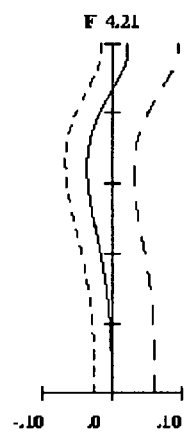
Figure 21H:
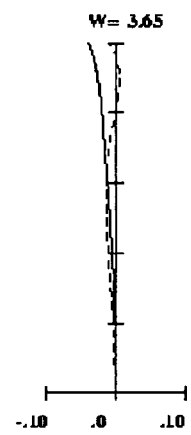
Figure 21I:
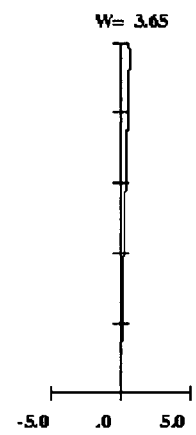
Figure 22A:
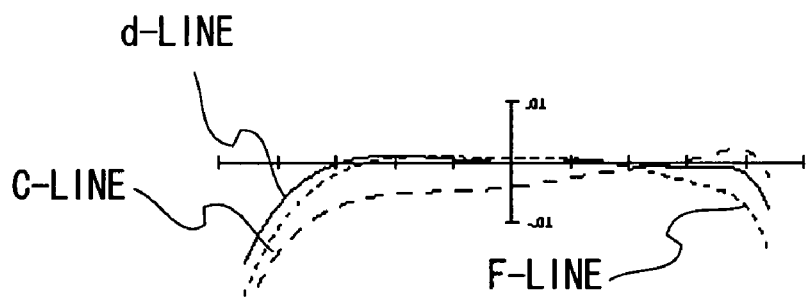
FIGS. 22A to 22F are lateral aberration diagrams of a zoom lens system according to Example 4 at a telephoto limit.
Figure 22B:
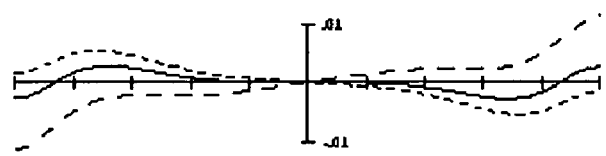
Figure 22C:
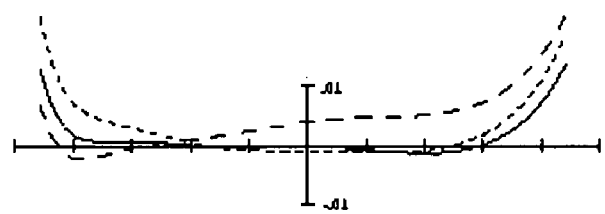
Figure 22D:
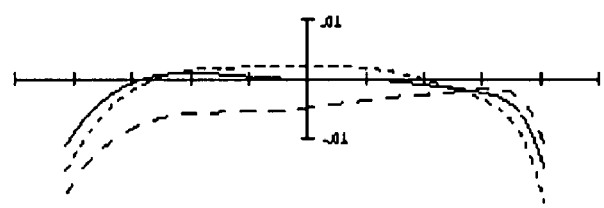
Figure 22E:
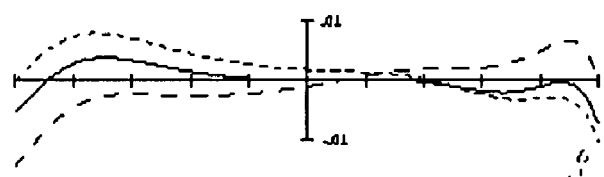
Figure 22F:
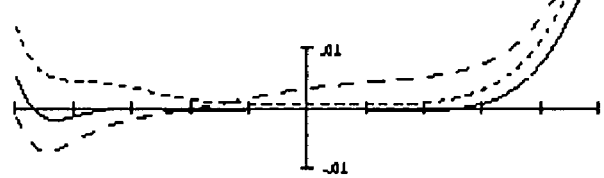
Figure 23A:
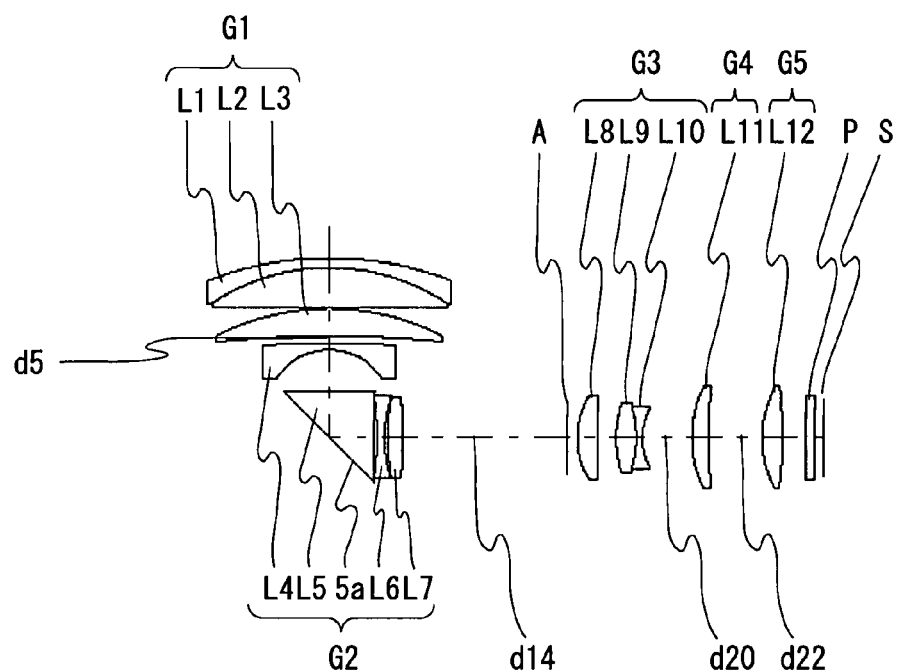
FIGS. 23A to 23C are lens arrangement diagrams showing a zoom lens system according to Embodiment 10 (Example 5) in an infinity in-focus condition at a wide-angle limit, a middle position and a telephoto limit.
Figure 23B:
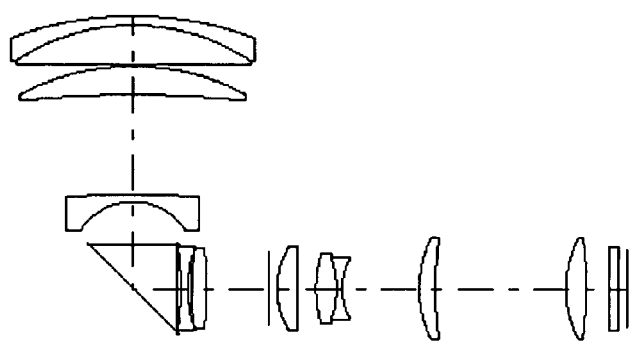
Figure 23C:
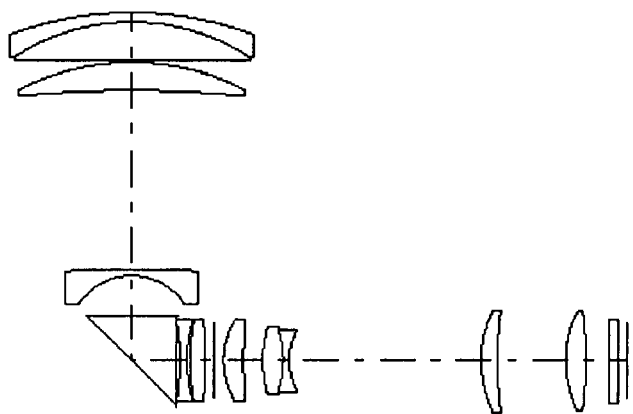
Figure 24A:
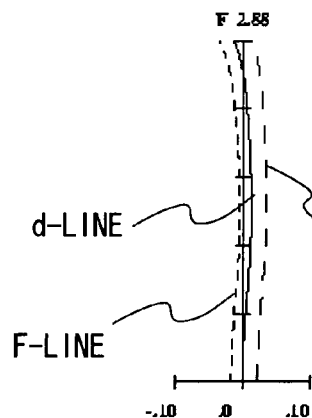
FIGS. 24A to 24I are longitudinal aberration diagrams of a zoom lens system according to Example 5 in an infinity in-focus condition at a wide-angle limit, a middle position and a telephoto limit.
Figure 24B:
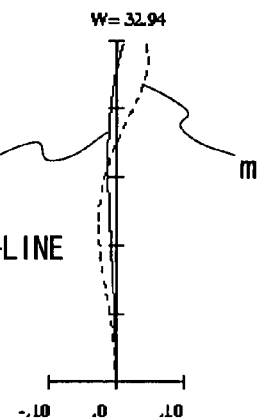
Figure 24C:
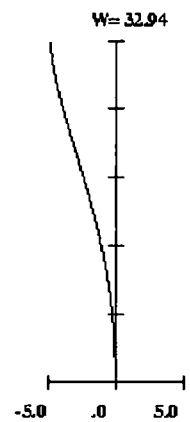
Figure 24D:
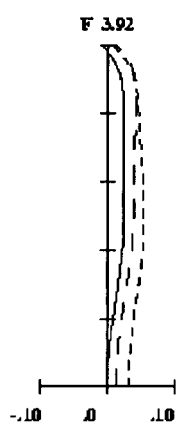
Figure 24E:
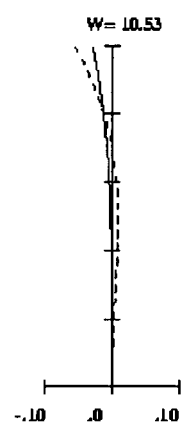
Figure 24F:
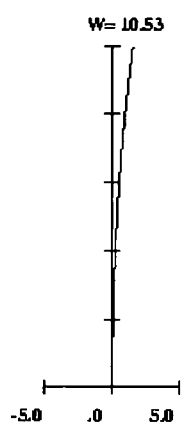
Figure 24G:
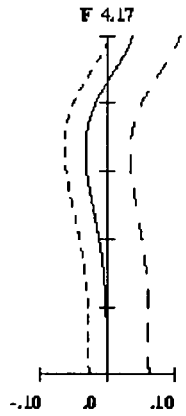
Figure 24H:
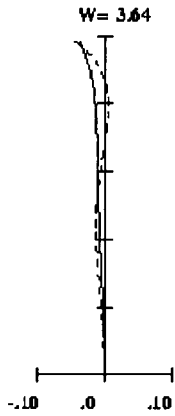
Figure 24I:
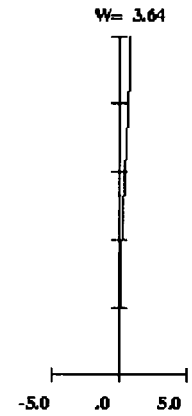
Figure 25A:
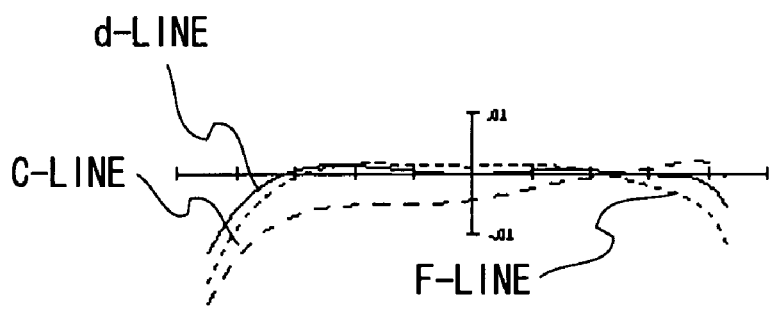
FIGS. 25A to 25F are lateral aberration diagrams of a zoom lens system according to Example 5 at a telephoto limit.
Figure 25B:
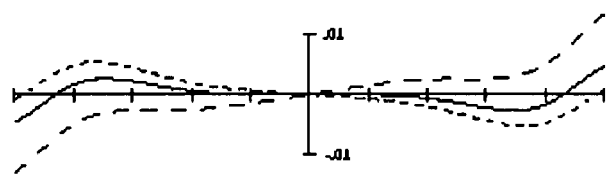
Figure 25C:
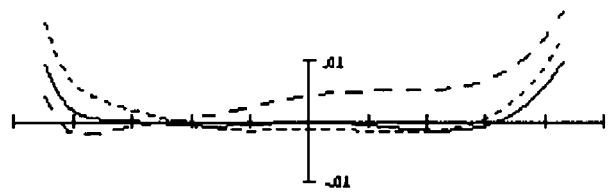
Figure 25D:
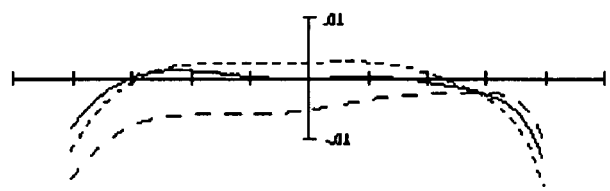
Figure 25E:
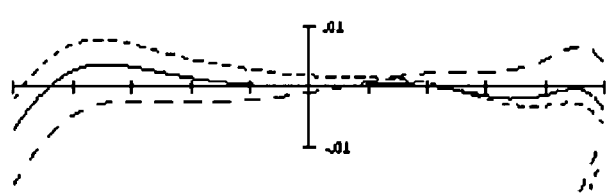
Figure 25F:
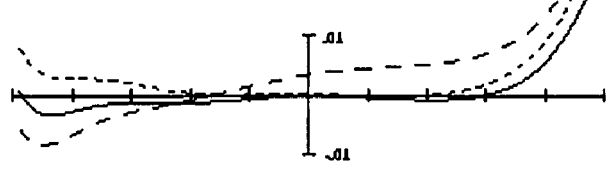

The zoom lens system applicable to the imaging device of Embodiments 1 to 5 is described below in further detail with reference to the drawings. FIGS. 11A to 11C are lens arrangement diagrams of a zoom lens system according to Embodiment 6. FIGS. 14A to 14C are lens arrangement diagrams of a zoom lens system according to Embodiment 7. FIGS. 17A to 17C are lens arrangement diagrams of a zoom lens system according to Embodiment 8. FIGS. 20A to 20C are lens arrangement diagrams of a zoom lens system according to Embodiment 9. FIGS. 23A to 23C are lens arrangement diagrams of a zoom lens system according to Embodiment 10. FIGS. 11A, 14A, 17A, 20A and 23A show the lens construction at a wide-angle limit (the shortest focal length condition: focal length $f_W$). FIGS. 11B, 14B, 17B, 20B and 23B show the lens construction at the middle position (the middle focal length condition: focal length $f_M=\sqrt{(f_W*f_T)}$). FIGS. 11C, 14C, 17C, 20C and 23C show the lens construction at a telephoto limit (the longest focal length condition: focal length $f_T$).

Each zoom lens system according to Embodiments 6 to 10, in order from the object side to the image side, comprises: a first lens unit G1 having positive optical power; a second lens unit G2 having negative optical power; a diaphragm A; a third lens unit G3 having positive optical power; a fourth lens unit G4 having positive optical power; and a fifth lens unit G5 having positive optical power. Here, each of a fifth lens element L5 of the second lens unit G2 shown in FIGS. 11A to 11C, 14A to 14C, 17A to 17C, 20A to 20C and 23A to 23C, corresponds to the lens element (prism) having a reflecting surface. In the description, the reflecting surface is indicated as 5a. Further, in each of FIGS. 11A to 11C, 14A to 14C, 17A to 17C, 20A to 20C and 23A to 23C, a straight line drawn on the rightmost side indicates the position of an image surface S. On its object side, a plane parallel plate P such as an optical low-pass filter, a face plate of an image sensor or the like is provided. In the zoom lens system according to Embodiments 6 to 10, these lens units are arranged in a desired optical power construction, so that size reduction is achieved in the entire lens system in a state that high magnification variation ratio is achieved and that high optical performance is satisfied.

As shown in FIGS. 11A to 11C, in the zoom lens system according to Embodiment 6, the first lens unit G1, in order from the object side to the image side, comprises: a negative meniscus first lens element L1 with the convex surface facing the object side; a planer-convex second lens element L2 with the convex surface facing the object side; and a positive meniscus third lens element L3 with the convex surface facing the object side. Among these, the first lens element L1 and the second lens element L2 are cemented with each other.

In the zoom lens system according to Embodiment 6, the second lens unit G2, in order from the object side to the image side, comprises: a negative meniscus fourth lens element L4 with the convex surface facing the object side; a lens element L5 having plane incident and exit surfaces and a reflecting surface 5a; a bi-concave sixth lens element L6; and a bi-convex seventh lens element L7.

In the zoom lens system according to Embodiment 6, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other.

In the zoom lens system according to Embodiment 6, the fourth lens unit G4 comprises solely a positive meniscus eleventh lens element L11 with the convex surface facing the object side.

In the zoom lens system according to Embodiment 6, the fifth lens unit G5, in order from the object side to the image side, comprises: a bi-convex twelfth lens element L12; and a negative meniscus thirteenth lens element L13 with the convex surface facing the image side. The twelfth lens element L12 and the thirteenth lens element L13 are cemented with each other.

In the zoom lens system according to Embodiment 6, in zooming from the wide-angle limit to the telephoto limit, the first lens unit G1 and the third lens unit G3 move to the object side, while the fourth lens unit G4 moves with locus of a convex to the object side with changing the interval with the third lens unit G3, and while the second lens unit G2 and the fifth lens unit G5 are fixed relative to the image surface.

As shown in FIGS. 14A to 14C, in the zoom lens system according to Embodiment 7, the first lens unit G1, in order from the object side to the image side, comprises: a negative meniscus first lens element L1 with the convex surface facing the object side; a planer-convex second lens element L2 with the convex surface facing the object side; and a positive meniscus third lens element L3 with the convex surface facing the object side. Among these, the first lens element L1 and the second lens element L2 are cemented with each other.

In the zoom lens system according to Embodiment 7, the second lens unit G2, in order from the object side to the image side, comprises: a negative meniscus fourth lens element L4 with the convex surface facing the object side; a lens element L5 having plane incident and exit surfaces and a reflecting surface 5a; a bi-concave sixth lens element L6; and a bi-convex seventh lens element L7.

In the zoom lens system according to Embodiment 7, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other.

In the zoom lens system according to Embodiment 7, the fourth lens unit G4 comprises solely a positive meniscus eleventh lens element L11 with the convex surface facing the object side.

In the zoom lens system according to Embodiment 7, the fifth lens unit G5, in order from the object side to the image side, comprises: a bi-convex twelfth lens element L12; and a negative meniscus thirteenth lens element L13 with the convex surface facing the image side. The twelfth lens element L12 and the thirteenth lens element L13 are cemented with each other.

In the zoom lens system according to Embodiment 7, in zooming from the wide-angle limit to the telephoto limit, the first lens unit G1 and the third lens unit G3 move to the object side, while the fourth lens unit G4 moves with locus of a convex to the object side with changing the interval with the third lens unit G3, and while the second lens unit G2 and the fifth lens unit G5 are fixed relative to the image surface.

As shown in FIGS. 17A to 17C, in the zoom lens system according to Embodiment 8, the first lens unit G1, in order from the object side to the image side, comprises: a negative meniscus first lens element L1 with the convex surface facing the object side; a planer-convex second lens element L2 with the convex surface facing the object side; and a positive meniscus third lens element L3 with the convex surface facing the object side. Among these, the first lens element L1 and the second lens element L2 are cemented with each other.

In the zoom lens system according to Embodiment 8, the second lens unit G2, in order from the object side to the image side, comprises: a negative meniscus fourth lens element L4 with the convex surface facing the object side; a lens element L5 having plane incident and exit surfaces and a reflecting surface 5a; a bi-concave sixth lens element L6; and a bi-convex seventh lens element L7.

In the zoom lens system according to Embodiment 8, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other.

Further, in the zoom lens system according to Embodiment 8, the fourth lens unit G4 comprises solely a positive meniscus eleventh lens element L11 with the convex surface facing the object side.

Further, in the zoom lens system according to Embodiment 8, the fifth lens unit G5, in order from the object side to the image side, comprises: a bi-convex twelfth lens element L12; and a negative meniscus thirteenth lens element L13 with the convex surface facing the image side. The twelfth lens element L12 and the thirteenth lens element L13 are cemented with each other.

In the zoom lens system according to Embodiment 8, in zooming from the wide-angle limit to the telephoto limit, the first lens unit G1 and the third lens unit G3 move to the object side, while the fourth lens unit G4 moves with locus of a convex to the object side with changing the interval with the third lens unit G3, and while the second lens unit G2 and the fifth lens unit G5 are fixed relative to the image surface.

As shown in FIGS. 20A to 20C, in the zoom lens system according to Embodiment 9, the first lens unit G1, in order from the object side to the image side, comprises: a negative meniscus first lens element L1 with the convex surface facing the object side; a planer-convex second lens element L2 with the convex surface facing the object side; and a positive meniscus third lens element L3 with the convex surface facing the object side. Among these, the first lens element L1 and the second lens element L2 are cemented with each other.

In the zoom lens system according to Embodiment 9, the second lens unit G2, in order from the object side to the image side, comprises: a negative meniscus fourth lens element L4 with the convex surface facing the object side; a lens element L5 having plane incident and exit surfaces and a reflecting surface 5a; a bi-concave sixth lens element L6; and a bi-convex seventh lens element L7.

Further, in the zoom lens system according to Embodiment 9, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other.

Further, in the zoom lens system according to Embodiment 9, the fourth lens unit G4 comprises solely a positive meniscus eleventh lens element L11 with the convex surface facing the object side.

Further, in the zoom lens system according to Embodiment 9, the fifth lens unit G5 comprises solely a bi-convex twelfth lens element L12.

In the zoom lens system according to Embodiment 9, in zooming from the wide-angle limit to the telephoto limit, the first lens unit G1 and the third lens unit G3 move to the object side, while the fourth lens unit G4 moves with locus of a convex to the object side with changing the interval with the third lens unit G3, and while the second lens unit G2 and the fifth lens unit G5 are fixed relative to the image surface.

As shown in FIGS. 23 to 23C, in the zoom lens system according to Embodiment 10, the first lens unit G1, in order from the object side to the image side, comprises: a negative meniscus first lens element L1 with the convex surface facing the object side; a planer-convex second lens element L2 with the convex surface facing the object side; and a positive meniscus third lens element L3 with the convex surface facing the object side. Among these, the first lens element L1 and the second lens element L2 are cemented with each other.

In the zoom lens system according to Embodiment 10, the second lens unit G2, in order from the object side to the image side, comprises: a negative meniscus fourth lens element L4 with the convex surface facing the object side; a lens element L5 having plane incident and exit surfaces and a reflecting surface 5a; a bi-concave sixth lens element L6; and a bi-convex seventh lens element L7.

Further, in the zoom lens system according to Embodiment 10, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other.

Further, in the zoom lens system according to Embodiment 10, the fourth lens unit G4 comprises solely a positive meniscus eleventh lens element L11 with the convex surface facing the object side.

Further, in the zoom lens system according to Embodiment 10, the fifth lens unit G5 comprises solely a bi-convex twelfth lens element L12.

In the zoom lens system according to Embodiment 10, in zooming from the wide-angle limit to the telephoto limit, the first lens unit G1 and the third lens unit G3 move to the object side, while the fourth lens unit G4 moves with locus of a convex to the object side with changing the interval with the third lens unit G3, and while the second lens unit G2 and the fifth lens unit G5 are fixed relative to the image surface.

As described above, the zoom lens system according to Embodiments 6 to 10 has a plurality of lens units each composed of at least one lens element. Here, as long as the zoom lens system comprises: a first lens unit having positive optical power; a second lens unit that includes a lens element having a reflecting surface and that has negative optical power; and subsequent lens units including at least one lens unit having positive optical power, the number of lens units constituting such a zoom lens system is not limited to a specific value. That is, a five-unit construction may be employed as in Embodiments 6 to 10. Another construction is also employable.

In the zoom lens system according to Embodiments 6 to 10, an interval between at least any two lens units among the plurality of lens units is changed so that zooming is performed. Then, any one of these lens units, any one of the lens elements, or alternatively a plurality of adjacent lens elements that constitute one lens unit move in a direction perpendicular to the optical axis, so that blur caused in the image by hand blur, vibration or the like can be compensated optically.

In each embodiment, as described above, in the optical compensation of image blur, when any one of a plurality of lens units, any one of the lens elements, or alternatively a plurality of adjacent lens elements that constitute one lens unit move in a direction perpendicular to the optical axis, image blur can be compensated optically in such a manner that size increase in the entire zoom lens system is suppressed while excellent imaging characteristics such as small decentering coma aberration and decentering astigmatism are satisfied.

Here, in each embodiment, when any one of the lens units other than the second lens unit, any one of the lens elements other than the lens element having a reflecting surface, or alternatively a plurality of adjacent lens elements that are other than the lens element having a reflecting surface and that constitute one lens unit move in a direction perpendicular to the optical axis, the entire zoom lens system can be constructed more compactly. Further, image blur can be compensated in a state that excellent imaging characteristics are satisfied. Thus, this construction is preferable. More preferably, any one of the lens units not including the lens element having a reflecting surface moves in a direction perpendicular to the optical axis.

Further, in each embodiment, when any one of the lens units located on the image side relative to the second lens unit, any one of the lens elements that constitute any lens unit located on the image side relative to the second lens unit, or alternatively a plurality of adjacent lens elements that constitute one lens unit located on the image side relative to the second lens unit move in a direction perpendicular to the optical axis, the entire zoom lens system can be constructed yet more compactly. Further, image blur can be compensated in a state that excellent imaging characteristics are satisfied. Thus, this construction is preferable. More preferably, any one of the lens units not including the lens element having a reflecting surface moves in a direction perpendicular to the optical axis.

Furthermore, in each embodiment, when any one of the subsequent lens units, especially the third lens unit located on the most object side among the subsequent lens units, moves in a direction perpendicular to the optical axis, the entire zoom lens system can be constructed remarkably compactly. Further, image blur can be compensated in a state that excellent imaging characteristics are satisfied. Thus, this construction is remarkably preferable.

Conditions are described below that are preferably satisfied by a zoom lens system like the zoom lens system according to Embodiments 6 to 10, in order from the object side to the image side, comprising: a first lens unit having positive optical power; a second lens unit that includes a lens element having a reflecting surface for bending a light beam from an object and that has negative optical power; and subsequent lens units including at least one lens unit having positive optical power. Here, a plurality of preferable conditions are set forth for the zoom lens system according to each embodiment. The construction that satisfies all the plural conditions is most desirable for the zoom lens system. However, when an individual condition is satisfied, a zoom lens system providing the corresponding effect can be obtained.

For example, in a zoom lens system like the zoom lens system according to Embodiments 6 to 10, the following condition (1) is satisfied;

$$0.50 < (C-S)/H < 1.00 \tag{1}$$

where,

C is an effective radius of the image side surface of the most object side lens element in the second lens unit that causes an interval between the image side surface of the most object side lens element in the second lens unit and the lens element having a reflecting surface to be equal to a sag of the image side surface of the most object side lens element in the second lens unit $$C = \sqrt{(2R \cdot d_R - d_R^2)},$$

S is a sag of the image side surface of the most object side lens element in the second lens unit at height H, H is one-half of an optical axial thickness of the lens element having a reflecting surface, R is a radius of curvature of the image side surface of the most object side lens element in the second lens unit, and $d_R$ is an interval between the most object side lens element in the second lens unit and the lens element having a reflecting surface.

The condition (1) is a condition for achieving satisfactory imaging characteristics and realizing size reduction in the zoom lens system. When the value exceeds the upper limit of the condition (1), it becomes difficult that the reflecting surface bends the light beam from an object into a horizontal direction. In contrast, when the value goes below the lower limit of the condition (1), imaging performance degrades in the periphery part. Thus, in order that the imaging performance should be improved, this causes a tendency of size increase in the entire zoom lens system.

Here, when at least one of the following conditions (1)' and (1)" is satisfied, the above effect is achieved more successfully.

$$0.75<(C-S)/H \quad (1)'$$

$$(C-S)/H<0.95 \quad (1)''$$

Further, for example, in a zoom lens system like the zoom lens system according to Embodiments 6 to 10, it is preferable that the following condition (2) is satisfied;

$$1.2<d_R \cdot f_W/d_2<1.8 \quad (2)$$

(here, $Z=f_T/f_W>5.0$)

where, $d_R$ is the interval between the most object side lens element in the second lens unit and the lens element having a reflecting surface, $d_2$ is an interval between the most object side lens element in the second lens unit and the lens element on the image side relative to the reflecting surface in the second lens unit, $f_W$ is a focal length of the entire zoom lens system at a wide-angle limit, and $f_T$ is a focal length of the entire zoom lens system at a telephoto limit.

The condition (2) is a condition for achieving satisfactory imaging characteristics and realizing size reduction in the zoom lens system. When the value exceeds the upper limit of the condition (2), imaging performance degrades in the periphery part. Thus, in order that the imaging performance should be improved, this causes a tendency of size increase in the entire zoom lens system. In contrast, when the value goes below the lower limit of the condition (2), because of the reflecting surface, a tendency arises that the light beam from an object becomes difficult to be bent horizontally.

Here, when the following condition (2)' is satisfied, the above effect is achieved more successfully.

$$1.2<d_R \cdot f_W/d_2<1.5 \quad (2)'$$

(here, $Z=f_T/f_W>5.0$)

Further, for example, in a zoom lens system like the zoom lens system according to Embodiments 6 to 10, when any one of the subsequent lens units including at least one lens unit having positive optical power moves in a direction perpendicular to the optical axis, it is preferable that the following conditions (3) and (4) are satisfied in the entire zoom lens system;

$$Y_T>Y \quad (3)$$

$$0.0<(Y/Y_T)/(f/f_T)<3.0 \quad (4)$$

(here, $Z=f_T/f_W>5.0$)

where, f is a focal length of the entire zoom lens system, $f_T$ is the focal length of the entire zoom lens system at a telephoto limit, Y is an amount of movement of the lens unit that moves in a direction perpendicular to the optical axis at the time of maximum blur compensation in a focal length f of the entire zoom lens system, $Y_T$ is an amount of movement of the lens unit that moves in a direction perpendicular to the optical axis at the time of maximum blur compensation in a focal length $f_T$ of the entire zoom lens system at a telephoto limit, and $f_W$ is the focal length of the entire zoom lens system at a wide-angle limit.

The conditions (3) and (4) relate to the amount of movement of the lens unit that moves in a direction perpendicular to the optical axis at the time of maximum blur compensation in the entire zoom lens system. In the case of a zoom lens system, when the compensation angle is constant over the entire zoom range, the amount of movement of the lens unit that moves in a direction perpendicular to the optical axis increases with increasing zoom ratio. On the contrary, the amount of movement of the lens unit that moves in a direction perpendicular to the optical axis decreases with decreasing zoom ratio. When the condition (3) is not satisfied or alternatively when the value exceeds the upper limit of the condition (4), blur compensation can become excessive. This could cause remarkable degradation in the optical performance. When the value goes below the lower limit of the condition (4), blur compensation becomes insufficient so that a sufficient blur compensation effect is not expected.

Here, when at least one of the following conditions (4)' and (4)" is satisfied, the above effect is achieved more successfully.

$$1.0<(Y/Y_T)/(f/f_T) \quad (4)'$$

$$(Y/Y_T)/(f/f_T)<2.0 \quad (4)''$$

(here, $Z=f_T/f_W>5.0$)

Further, for example, when a lens barrel that holds a zoom lens system like the zoom lens system according to Embodiments 6 to 10 is applied to an imaging device where as in Embodiments 1 to 5, in the accommodated state, the second lens unit escapes to the image side of the zoom lens system along the optical axis direction, it is preferable that the zoom lens system satisfies the following condition (5);

$$0.25<\Sigma D/\Sigma d_A<0.60 \quad (5)$$

where, $\Sigma D$ is a total optical axial thickness of the lens units located on the image side relative to the second lens unit, and $\Sigma d_A$ is a total optical axial air space between the lens units that are located on the image side relative to the second lens unit and that move to the optical axis direction in zooming.

The condition (5) relates to the thickness of the imaging device in the accommodated state. When the value exceeds the upper limit of the condition (5), the escaping optical element becomes large. This causes a tendency of increase in the size of the imaging device. In contrast, when the value goes below the lower limit of the condition (5), a tendency arises that sufficient aberration compensation becomes difficult in the entire zoom lens system.

Here, when at least one of the following conditions (5)' and (5)" is satisfied, the above effect is achieved more successfully.

$$0.30<\Sigma D/\Sigma d_A \quad (5)'$$

$$\Sigma D/\Sigma d_A<0.40 \quad (5)''$$

Further, for example, when a lens barrel that holds a zoom lens system like the zoom lens system according to Embodiments 6 to 10 is applied to an imaging device where as in Embodiments 1 to 5, in the accommodated state, the second lens unit escapes to the image side of the zoom lens system along the optical axis direction, it is preferable that the zoom lens system satisfies the following condition (6);

$$0.80 < (\Sigma D_{12} + H_2)/\Sigma d_A < 1.25 \tag{6}$$

where, $\Sigma D_{12}$ is a total optical axial thickness of the first lens unit and the second lens unit, $H_2$ is the optical axial thickness of the lens element having a reflecting surface, and $\Sigma d_A$ is a total optical axial air space between the lens units that are located on the image side relative to the second lens unit and that move to the optical axis direction in zooming.

The condition (6) relates to the thickness of the imaging device in the accommodated state. When the value exceeds the upper limit of the condition (6), the escaping optical element becomes large. This causes a tendency of increase in the size of the imaging device. In contrast, when the value goes below the lower limit of the condition (6), a tendency arises that sufficient aberration compensation becomes difficult in the entire zoom lens system.

Here, when at least one of the following conditions (6)' and (6)" is satisfied, the above effect is achieved more successfully.

$$0.90 < (\Sigma D_{12} + H_2)/\Sigma d_A \tag{6)'}$$

$$(\Sigma D_{12} + H_2)/\Sigma d_A < 1.20 \tag{6)''}$$

The zoom lens system according to each of Embodiments 6 to 10 has been a zoom lens system of five units having a construction of positive, negative, positive, positive and positive, in order from the object side to the image side, comprising: a first lens unit G1 having positive optical power; a second lens unit G2 having negative optical power; a diaphragm A; a third lens unit G3 having positive optical power; a fourth lens unit G4 having positive optical power; and a fifth lens unit G5 having positive optical power. However, the present invention is not limited to this construction. For example, the employed construction may be: a three-unit construction of positive, negative and positive; a four-unit construction of positive, negative, positive and positive, or of positive, negative, positive and negative; or alternatively a five-unit construction of positive, negative, positive, positive and negative, or of positive, negative, positive, negative and positive. That is, as long as comprising a first lens unit having positive optical power, a second lens unit having negative optical power, and subsequent lens units that include at least one lens unit having positive optical power, any zoom lens system may be applied suitably to the imaging device, for example, according to Embodiments 1 to 5.

Here, the lens units constituting the zoom lens system of Embodiments 6 to 10 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

An imaging device comprising a zoom lens system according to Embodiments 6 to 10 described above and an image sensor such as a CCD or a CMOS may be applied to a mobile telephone, a PDA (Personal Digital Assistance), a surveillance camera in a surveillance system, a Web camera, a vehicle-mounted camera or the like.

Further, the construction of the digital still camera and the zoom lens system according to Embodiments 6 to 10 described above is applicable also to a digital video camera for moving images. In this case, moving images with high resolution can be acquired in addition to still images.

Hereinafter, numerical examples which are actual implementations of the zoom lens systems according to Embodiments 6 to 10 will be described. In the numerical examples, the units of the length in the tables are all "mm". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression:

$$Z = \frac{h^2/r}{1 + \sqrt{1-(1+\kappa)(h/r)^2}} + Dh^4 + Eh^6 + Fh^8 + Gh^{10}$$

Here, κ is the conic constant, D, E, F and G are a fourth-order, sixth-order, eighth-order and tenth-order aspherical coefficients, respectively.

FIGS. 12A to 12I are longitudinal aberration diagrams of a zoom lens system according to Example 1. FIGS. 15A to 15I are longitudinal aberration diagrams of a zoom lens system according to Example 2. FIGS. 18A to 18I are longitudinal aberration diagrams of a zoom lens system according to Example 3. FIGS. 21A to 21I are longitudinal aberration diagrams of a zoom lens system according to Example 4. FIGS. 24A to 24I are longitudinal aberration diagrams of a zoom lens system according to Example 5.

FIGS. 12A to 12C, 15A to 15C, 18A to 18C, 21A to 21C, and 24A to 24C show the longitudinal aberration at the wide-angle limit. FIGS. 12D to 12F, 15D to 15F, 18D to 18F, 21D to 21F, and 24D to 24F show the longitudinal aberration at the middle position. FIGS. 12G to 12I, 15G to 15I, 18G to 18I, 21G to 21I, and 24G to 24I show the longitudinal aberration at the telephoto limit. FIGS. 12A, 12D, 12G, 15A, 15D, 15G, 18A, 18D, 18G, 21A, 21D, 21G, 24A, 24D and 24G are spherical aberration diagrams. FIGS. 12B, 12E, 12H, 15B, 15E, 15H, 18B, 18E, 18H, 21B, 21E, 21H, 24B, 24E and 24H are astigmatism diagrams. FIGS. 12C, 12F, 12I, 15C, 15F, 15I, 18C, 18F, 18I, 21C, 21F, 21I, 24C, 24F and 24I are distortion diagrams. In each spherical aberration diagram, the vertical axis indicates the F-number, and the solid line, the short dash line and the long dash line indicate the characteristics to the d-line, the F-line and the C-line, respectively. In each astigmatism diagram, the vertical axis indicates the half view angle, and the solid line and the dash line indicate the characteristics to the sagittal image plane (in each Fig., indicated as "s") and the meridional image plane (in each Fig., indicated as "m"), respectively. In each distortion diagram, the vertical axis indicates the half view angle.

FIGS. 13A to 13F are lateral aberration diagrams of a zoom lens system according to Example 1 at the telephoto limit. FIGS. 16A to 16F are lateral aberration diagrams of a zoom lens system according to Example 2 at the telephoto limit. FIGS. 19A to 19F are lateral aberration diagrams of a zoom lens system according to Example 3 at the telephoto limit. FIGS. 22A to 22F are lateral aberration diagrams of a zoom lens system according to Example 4 at the telephoto limit. FIGS. 25A to 25F are lateral aberration diagrams of a zoom lens system according to Example 5 at the telephoto limit.

FIGS. 13A to 13C, 16A to 16C, 19A to 19C, 22A to 22C, and 25A to 25C are lateral aberration diagrams at the telephoto limit corresponding to a basic state that image blur compensation is not performed. FIGS. 13D to 13F, 16D to 16F, 19D to 19F, 22D to 22F, and 25D to 25F are lateral aberration diagrams corresponding to an image blur compensation state at the telephoto limit in which the entirety of the third lens unit G3 is moved by a predetermined amount in a direction perpendicular to the optical axis. Among the lateral aberration diagrams of the basic state, FIGS. 13A, 16A, 19A, 22A, and 25A show the lateral aberration at an image point at 75% of the maximum image height. FIGS. 13B, 16B, 19B, 22B, and 25B show the lateral aberration at the axial image point. FIGS. 13C, 16C, 19C, 22C, and 25C show the lateral aberration at an image point at −75% of the maximum image height. Among the lateral aberration diagrams of the image blur compensation state, FIGS. 13D, 16D, 19D, 22D, and 25D show the lateral aberration at an image point at 75% of the maximum image height. FIGS. 13E, 16E, 19E, 22E, and 25E show the lateral aberration at the axial image point. FIGS. 13F, 16F, 19F, 22F, and 25F show the lateral aberration at an image point at −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In the lateral aberration diagrams of FIGS. 13A to 13F, 16A to 16F, 19A to 19F, 22A to 22F, and 25A to 25F, the meridional image plane is adopted as the plane containing the optical axis of the first lens unit G1 and the optical axis of the third lens unit G3.

Here, the amount of movement in a direction perpendicular to the optical axis of the third lens unit G3 in the image blur compensation state is 0.211 mm in Example 1, 0.192 mm in Example 2, 0.208 mm in Example 3, 0.210 mm in Example 4, and 0.209 mm in Example 5. Here, the amount of image decentering in a case that the zoom lens system inclines by 0.3° when the shooting distance is infinity at the telephoto limit is equal to the amount of image decentering in a case that the entirety of the third lens unit G3 moves in parallel in a direction perpendicular to the optical axis by each of the above values.

As seen from the lateral aberration diagrams, satisfactory symmetry is obtained in the lateral aberration at the axial image point. Further, when the lateral aberration at the +75% image point and the lateral aberration at the −75% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel movement required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Example 1

A zoom lens system of Example 1 corresponds to Embodiment 6 shown in FIGS. 11A to 11C. Table 1 shows the lens data of the zoom lens system of Example 1. Table 2 shows the focal length, the F-number, the half view angle and the variable axial distance data, when the shooting distance is infinity. Table 3 shows the aspherical data.

TABLE 1

| Lens unit | Lens element | Surface | r | d | nd | vd |
|---|---|---|---|---|---|---|
| G1 | L1 | 1 | 43.235 | 1.0000 | 1.846660 | 23.78 |
| | L2 | 2 | 26.810 | 4.7000 | 1.497000 | 81.61 |
| | | 3 | ∞ | 0.1500 | | |
| | L3 | 4 | 26.098 | 3.1000 | 1.772500 | 49.65 |
| | | 5 | 85.264 | Variable | | |
| G2 | L4 | 6 | 85.264 | 0.6500 | 1.834810 | 42.72 |
| | | 7 | 6.200 | 3.5040 | | |
| | L5 | 8 | ∞ | 4.5000 | 1.622990 | 58.17 |
| | Reflecting surface | 9 | ∞ | 4.5000 | 1.622990 | 58.17 |
| | | 10 | ∞ | 0.5240 | | |
| | L6 | 11 | −14.854* | 0.7200 | 1.665470 | 55.18 |
| | | 12 | 27.893 | 0.2970 | | |
| | L7 | 13 | 138.643 | 2.0000 | 1.846660 | 23.78 |
| | | 14 | −18.386 | Variable | | |
| | Diaphragm | 15 | ∞ | 1.8000 | | |
| G3 | L8 | 16 | 10.312 | 2.0000 | 1.806100 | 40.73 |
| | | 17 | 243.603 | 2.4720 | | |
| | L9 | 18 | 11.465* | 2.0000 | 1.665470 | 55.18 |
| | L10 | 19 | −15.089 | 0.6000 | 1.805180 | 25.46 |
| | | 20 | 7.416 | Variable | | |
| G4 | L11 | 21 | 11.951* | 1.7000 | 1.514430 | 63.28 |
| | | 22 | 27.633 | Variable | | |
| G5 | L12 | 23 | 13.700 | 2.3000 | 1.696800 | 55.48 |
| | L13 | 24 | −13.700 | 0.6000 | 1.755200 | 27.52 |
| | | 25 | −30.837 | 0.5000 | | |
| | P | 26 | ∞ | 0.9000 | 1.516800 | 64.20 |
| | | 27 | ∞ | | | |

TABLE 2

| Axial distance | Wide-angle limit | Middle position | Telephoto limit |
|---|---|---|---|
| d5 | 1.9070 | 11.0972 | 20.8191 |
| d14 | 20.3013 | 7.3686 | 1.5000 |
| d20 | 6.9473 | 10.5350 | 20.0138 |
| d22 | 8.7132 | 18.0582 | 14.4466 |
| f | 5.72 | 17.78 | 54.91 |
| F | 2.88 | 3.97 | 4.23 |
| ω | 30.96 | 10.35 | 3.39 |

TABLE 3

| Surface | κ | D | E | F | G |
|---|---|---|---|---|---|
| 11 | −2.5004E+00 | 1.3852E−04 | 1.9875E−06 | −3.6336E−08 | 1.9112E−09 |
| 18 | 0.0000E+00 | −2.0999E−04 | −1.7665E−06 | −1.4733E−07 | 3.1100E−09 |
| 21 | −2.7652E−01 | −3.4717E−05 | 7.8066E−07 | −3.0819E−08 | 5.2779E−10 |

Example 2

A zoom lens system of Example 2 corresponds to Embodiment 7 shown in FIGS. 14A to 14C. Table 4 shows the lens data of the zoom lens system of Example 2. Table 5 shows the focal length, the F-number, the half view angle and the variable axial distance data, when the shooting distance is infinity. Table 6 shows the aspherical data.

TABLE 4

| Lens unit | Lens element | Surface | r | d | nd | νd |
|---|---|---|---|---|---|---|
| G1 | L1 | 1 | 35.978 | 0.8600 | 1.846660 | 23.78 |
|  | L2 | 2 | 21.193 | 4.0420 | 1.487490 | 70.45 |
|  |  | 3 | ∞ | 0.1290 |  |  |
|  | L3 | 4 | 21.418 | 2.6660 | 1.772500 | 49.65 |
|  |  | 5 | 83.587 | Variable |  |  |
| G2 | L4 | 6 | 83.587 | 0.5590 | 1.834810 | 42.72 |
|  |  | 7 | 5.332 | 3.0130 |  |  |
|  | L5 | 8 | ∞ | 3.8700 | 1.622990 | 58.17 |
|  | Reflecting surface | 9 | ∞ | 3.8700 | 1.622990 | 58.17 |
|  |  | 10 | ∞ | 0.3716 |  |  |
|  | L6 | 11 | −13.762* | 0.6192 | 1.606020 | 57.44 |
|  |  | 12 | 16.681 | 0.2641 |  |  |
|  | L7 | 13 | 39.290 | 1.7200 | 1.846660 | 23.78 |
|  |  | 14 | −20.706 | Variable |  |  |
|  | Diaphragm | 15 | ∞ | 1.5480 |  |  |
| G3 | L8 | 16 | 8.322 | 1.7200 | 1.806100 | 40.73 |
|  |  | 17 | 117.230 | 2.1210 |  |  |
|  | L9 | 18 | 9.757* | 1.7200 | 1.665470 | 55.18 |
|  | L10 | 19 | −11.523 | 0.5160 | 1.805180 | 25.46 |
|  |  | 20 | 6.080 | Variable |  |  |
| G4 | L11 | 21 | 9.946* | 1.4620 | 1.514430 | 63.28 |
|  |  | 22 | 26.945 | Variable |  |  |
| G5 | L12 | 23 | 12.405 | 1.9780 | 1.696800 | 55.48 |
|  | L13 | 24 | −12.405 | 0.5160 | 1.755200 | 27.52 |
|  |  | 25 | −23.164 | 0.4300 |  |  |
|  | P | 26 | ∞ | 0.7740 | 1.516800 | 64.20 |
|  |  | 27 | ∞ |  |  |  |

TABLE 5

| Axial distance | Wide-angle limit | Middle position | Telephoto limit |
|---|---|---|---|
| d5 | 1.5464 | 9.1215 | 17.0304 |
| d14 | 16.3815 | 5.8973 | 1.2900 |
| d20 | 4.6854 | 7.5676 | 17.2043 |
| d22 | 7.7435 | 15.3457 | 10.3157 |
| f | 4.92 | 15.29 | 47.23 |
| F | 2.89 | 3.95 | 4.14 |
| ω | 30.86 | 10.37 | 3.40 |

TABLE 6

| Surface | κ | D | E | F | G |
|---|---|---|---|---|---|
| 11 | −1.6874E+00 | 3.3858E−04 | 2.1770E−06 | 2.3600E−07 | −6.3699E−09 |
| 18 | 0.0000E+00 | −4.0324E−04 | −3.0211E−06 | −7.9683E−07 | 2.6957E−08 |
| 21 | −6.6488E−01 | −8.4504E−06 | 6.5101E−07 | 6.6053E−09 | −1.0698E−09 |

Example 3

A zoom lens system of Example 3 corresponds to Embodiment 8 shown in FIGS. 17A to 17C. Table 7 shows the lens data of the zoom lens system of Example 3. Table 8 shows the focal length, the F-number, the half view angle and the variable axial distance data, when the shooting distance is infinity. Table 9 shows the aspherical data.

TABLE 7

| Lens unit | Lens element | Surface | r | d | nd | νd |
|---|---|---|---|---|---|---|
| G1 | L1 | 1 | 42.130 | 0.9500 | 1.846660 | 23.78 |
|  | L2 | 2 | 24.853 | 4.5000 | 1.487490 | 70.45 |
|  |  | 3 | ∞ | 0.1500 |  |  |
|  | L3 | 4 | 25.187 | 3.0000 | 1.772500 | 49.65 |
|  |  | 5 | 94.920 | Variable |  |  |
| G2 | L4 | 6 | 94.920 | 0.6305 | 1.834810 | 42.72 |
|  |  | 7 | 6.014 | 3.5532 |  |  |
|  | L5 | 8 | ∞ | 4.3650 | 1.622990 | 58.17 |
|  | Reflecting surface | 9 | ∞ | 4.3650 | 1.622990 | 58.17 |
|  |  | 10 | ∞ | 0.3070 |  |  |
|  | L6 | 11 | −19.577* | 0.6984 | 1.606020 | 57.44 |
|  |  | 12 | 16.652 | 0.3012 |  |  |
|  | L7 | 13 | 36.720 | 1.9400 | 1.846660 | 23.78 |
|  |  | 14 | −27.011 | Variable |  |  |
|  | Diaphragm | 15 | ∞ | 1.7460 |  |  |
| G3 | L8 | 16 | 9.622 | 1.9400 | 1.806100 | 40.73 |
|  |  | 17 | 213.444 | 2.1637 |  |  |
|  | L9 | 18 | 11.396* | 1.9400 | 1.665470 | 55.18 |
|  | L10 | 19 | −14.883 | 0.5820 | 1.805180 | 25.46 |
|  |  | 20 | 6.965 | Variable |  |  |
| G4 | L11 | 21 | 12.084* | 1.6490 | 1.514430 | 63.28 |
|  |  | 22 | 27.615 | Variable |  |  |
| G5 | L12 | 23 | 13.538 | 2.2310 | 1.696800 | 55.48 |
|  | L13 | 24 | −13.538 | 0.5820 | 1.755200 | 27.52 |
|  |  | 25 | −31.899 | 0.8859 |  |  |
|  | P | 26 | ∞ | 0.9000 | 1.516800 | 64.20 |
|  |  | 27 | ∞ |  |  |  |

TABLE 8

| Axial distance | Wide-angle limit | Middle position | Telephoto limit |
|---|---|---|---|
| d5 | 1.7776 | 10.6812 | 20.1140 |
| d14 | 19.7024 | 7.4376 | 1.5000 |
| d20 | 6.4473 | 8.8724 | 18.0000 |
| d22 | 8.4841 | 18.3238 | 15.1335 |
| f | 5.55 | 17.24 | 53.24 |
| F | 2.90 | 4.02 | 4.24 |
| ω | 31.64 | 10.63 | 3.50 |

TABLE 9

| Surface | κ | D | E | F | G |
|---|---|---|---|---|---|
| 11 | −5.1214E+00 | 2.1879E−04 | 2.8061E−06 | −2.6918E−08 | 1.7724E−09 |
| 18 | 0.0000E+00 | −2.5395E−04 | −2.6126E−06 | −1.5953E−07 | 2.6553E−09 |
| 21 | 2.4552E−01 | −7.0577E−05 | 3.7580E−07 | −2.0239E−08 | 1.7546E−10 |

Example 4

A zoom lens system of Example 4 corresponds to Embodiment 9 shown in FIGS. 20A to 20C. Table 10 shows the lens data of the zoom lens system of Example 4. Table 11 shows the focal length, the F-number, the half view angle and the variable axial distance data, when the shooting distance is infinity. Table 12 shows the aspherical data.

TABLE 10

| Lens unit | Lens element | Surface | r | d | nd | vd |
|---|---|---|---|---|---|---|
| G1 | L1 | 1 | 35.456 | 0.9000 | 1.846660 | 23.78 |
| | L2 | 2 | 21.617 | 3.7000 | 1.487490 | 70.45 |
| | | 3 | ∞ | 0.1500 | | |
| | L3 | 4 | 24.369 | 2.7000 | 1.772500 | 49.65 |
| | | 5 | 109.332 | Variable | | |
| G2 | L4 | 6 | 109.332 | 0.6300 | 1.834810 | 42.72 |
| | | 7 | 6.100 | 3.5086 | | |
| | L5 | 8 | ∞ | 4.4000 | 1.772500 | 49.65 |
| | Reflecting surface | 9 | ∞ | 4.4000 | 1.772500 | 49.65 |
| | | 10 | ∞ | 0.3059 | | |
| | L6 | 11 | −21.324* | 0.7200 | 1.606020 | 57.44 |
| | | 12 | 13.194 | 0.3108 | | |
| | L7 | 13 | 22.481 | 1.5000 | 1.846660 | 23.78 |
| | | 14 | −39.659 | Variable | | |
| | Diaphragm | 15 | ∞ | 0.9000 | | |
| G3 | L8 | 16 | 8.029 | 1.9400 | 1.806100 | 40.73 |
| | | 17 | 115.379 | 1.8863 | | |
| | L9 | 18 | 10.921* | 2.0000 | 1.665470 | 55.18 |
| | L10 | 19 | −9.554 | 0.5800 | 1.805180 | 25.46 |
| | | 20 | 6.051 | Variable | | |
| G4 | L11 | 21 | 11.538* | 1.6000 | 1.518350 | 70.33 |
| | | 22 | 39.674 | Variable | | |
| G5 | L12 | 23 | 10.884 | 2.0000 | 1.487490 | 70.45 |
| | | 24 | −34.597 | 2.2424 | | |
| | P | 25 | ∞ | 0.9000 | 1.516800 | 64.20 |
| | | 26 | ∞ | | | |

TABLE 11

| Axial distance | Wide-angle limit | Middle position | Telephoto limit |
|---|---|---|---|
| d5 | 0.7000 | 9.9286 | 17.4428 |
| d14 | 16.5940 | 6.2602 | 0.9000 |
| d20 | 5.2331 | 8.0229 | 18.9485 |
| d22 | 5.1335 | 12.6767 | 7.1127 |
| f | 5.28 | 17.23 | 50.72 |
| F | 2.89 | 3.93 | 4.21 |
| ω | 32.99 | 10.55 | 3.65 |

TABLE 12

| Surface | κ | D | E | F | G |
|---|---|---|---|---|---|
| 11 | 0.0000E+00 | 3.5604E−04 | 4.9503E−07 | 1.6624E−08 | 4.0776E−09 |
| 18 | 0.0000E+00 | −4.6806E−04 | −3.3313E−07 | −1.5165E−06 | 8.4085E−08 |
| 21 | 1.4744E−01 | −6.3685E−05 | 1.5223E−06 | −1.3252E−07 | 3.0861E−09 |

Example 5

A zoom lens system of Example 5 corresponds to Embodiment 10 shown in FIGS. 23A to 23C. Table 13 shows the lens data of the zoom lens system of Example 5. Table 14 shows the focal length, the F-number, the half view angle and the variable axial distance data, when the shooting distance is infinity. Table 15 shows the aspherical data.

TABLE 13

| Lens unit | Lens element | Surface | r | d | nd | vd |
|---|---|---|---|---|---|---|
| G1 | L1 | 1 | 35.114 | 0.9000 | 1.846660 | 23.78 |
| | L2 | 2 | 21.591 | 3.7000 | 1.487490 | 70.45 |
| | | 3 | ∞ | 0.1500 | | |
| | L3 | 4 | 24.457 | 2.7000 | 1.772500 | 49.65 |
| | | 5 | 109.770 | Variable | | |
| G2 | L4 | 6 | 109.770 | 0.6300 | 1.834810 | 42.72 |
| | | 7 | 6.258 | 4.0645 | | |
| | L5 | 8 | ∞ | 4.4000 | 1.772500 | 49.65 |
| | Reflecting surface | 9 | ∞ | 4.4000 | 1.772500 | 49.65 |
| | | 10 | ∞ | 0.3275 | | |
| | L6 | 11 | −20.562* | 0.7200 | 1.606020 | 57.44 |
| | | 12 | 13.123 | 0.3126 | | |
| | L7 | 13 | 22.973 | 1.5000 | 1.846660 | 23.78 |
| | | 14 | −39.342 | Variable | | |
| | Diaphragm | 15 | ∞ | 0.9000 | | |
| G3 | L8 | 16 | 8.045 | 1.9400 | 1.806100 | 40.73 |
| | | 17 | 117.856 | 1.8917 | | |
| | L9 | 18 | 10.924* | 2.0000 | 1.665470 | 55.18 |
| | L10 | 19 | −9.488 | 0.5800 | 1.805180 | 25.46 |
| | | 20 | 6.050 | Variable | | |
| G4 | L11 | 21 | 11.207* | 1.6000 | 1.518350 | 70.33 |
| | | 22 | 36.946 | Variable | | |
| G5 | L12 | 23 | 10.854 | 2.0000 | 1.487490 | 70.45 |
| | | 24 | −37.672 | 2.2650 | | |
| | P | 25 | ∞ | 0.9000 | 1.516800 | 64.20 |
| | | 26 | ∞ | | | |

TABLE 14

| Axial distance | Wide-angle limit | Middle position | Telephoto limit |
|---|---|---|---|
| d5 | 0.7000 | 9.8346 | 17.3397 |
| d14 | 16.2702 | 6.0545 | 0.9000 |
| d20 | 4.8584 | 7.5841 | 18.8861 |
| d22 | 5.3124 | 12.8018 | 6.6549 |
| f | 5.29 | 7.24 | 50.82 |
| F | 2.88 | 3.92 | 4.17 |
| ω | 32.94 | 10.54 | 3.64 |

TABLE 15

| Surface | κ | D | E | F | G |
|---|---|---|---|---|---|
| 11 | 0.0000E+00 | 3.4789E−04 | 2.2706E−07 | −2.5419E−08 | 5.5580E−09 |
| 18 | 0.0000E+00 | −4.6981E−04 | 9.0647E−07 | −1.4773E−06 | 7.5355E−08 |
| 21 | 1.2112E−01 | −6.6715E−05 | 1.6658E−06 | −1.3639E−07 | 3.2548E−09 |

The corresponding values to the above conditions are listed in the following Table 16. Here, $Y_W$ and $Y_M$ in Table 16 are as follows;

$Y_W$ is an amount of movement of the lens unit (the third lens unit) that moves in a direction perpendicular to the optical axis at the time of maximum blur compensation in a focal length $f_W$ of the entire zoom lens system at a wide-angle limit, and $Y_M$ is an amount of movement of the lens unit (the third lens unit) that moves in a direction perpendicular to the optical axis at the time of maximum blur compensation in a focal length $f_M$ of the entire zoom lens system at a middle position. Then, calculated are: the corresponding value $(Y_W/Y_T)/(f_W/f_T)$ in the case that the zoom lens system is at the wide-angle limit, that is, in the case that $Y=Y_W$ ($f=f_W$) in the condition (4); and the corresponding value $(Y_M/Y_T)/(f_M/f_T)$ in the case that the zoom lens system is at the middle position, that is, in the case that $Y=Y_M$ ($f=f_M$) in the condition (4).

TABLE 16

| | Example | | | | |
|---|---|---|---|---|---|
| Condition | 1 | 2 | 3 | 4 | 5 |
| (1) (C−S)/H | 0.811 | 0.811 | 0.827 | 0.829 | 0.921 |
| (2) $d_R \cdot f_W/d_2$ | 1.539 | 1.333 | 1.566 | 1.468 | 1.628 |
| (4) $(Y_W/Y_T)/(f_W/f_T)$ | 0.451 | 0.443 | 0.449 | 0.462 | 0.469 |
| (4) $(Y_M/Y_T)/(f_M/f_T)$ | 1.073 | 1.070 | 1.062 | 1.083 | 1.096 |
| (5) ΣD/Σ$d_A$ | 0.325 | 0.348 | 0.320 | 0.371 | 0.379 |
| (6) (Σ$D_{12}$ + $H_2$)/Σ$d_A$ | 0.963 | 1.032 | 0.967 | 1.188 | 1.233 |
| $Y_W$ | 0.031 | 0.027 | 0.030 | 0.030 | 0.030 |
| $Y_M$ | 0.073 | 0.067 | 0.072 | 0.077 | 0.078 |
| $Y_T$ | 0.211 | 0.192 | 0.208 | 0.210 | 0.209 |

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for a camera such as a digital still camera or a digital video camera requiring high image quality.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A zoom lens system comprising:
   a plurality of lens units each composed of at least one lens element, wherein
   an interval between at least any two lens units among the lens units is changed so that an optical image of an object is formed with a continuously variable magnification,
   the zoom lens system, in order from the object side to the image side, comprises: a first lens unit having positive optical power; a second lens unit that includes a lens element having a reflecting surface for bending a light beam from an object and that has negative optical power; and subsequent lens units including at least one lens unit having positive optical power, and
   the following condition (1) is satisfied:

$$0.50 < (C-S)/H < 1.00 \qquad (1)$$

where,
   C is an effective radius of the image side surface of the most object side lens element in the second lens unit that causes an interval between the image side surface of the most object side lens element in the second lens unit and the lens element having a reflecting surface to be equal to a sag of the image side surface of the most object side lens element in the second lens unit $$C = \sqrt{(2R \cdot d_R - d_R^2)},$$

S is a sag of the image side surface of the most object side lens element in the second lens unit at height H,
   H is one-half of an optical axial thickness of the lens element having a reflecting surface,
   R is a radius of curvature of the image side surface of the most object side lens element in the second lens unit, and
   $d_R$ is an interval between the most object side lens element in the second lens unit and the lens element having a reflecting surface.

2. The zoom lens system as claimed in claim 1, satisfying the following condition (2):

$$1.2 < d_R \cdot f_W/d_2 < 1.8 \qquad (2)$$

(where, $Z=f_T/f_W>5.0$)

in which,
   $d_R$ is the interval between the most object side lens element in the second lens unit and the lens element having a reflecting surface,
   $d_2$ is an interval between the most object side lens element in the second lens unit and the lens element on the image side relative to the reflecting surface in the second lens unit,
   $f_W$ is a focal length of the entire zoom lens system at a wide-angle limit, and
   $f_T$ is a focal length of the entire zoom lens system at a telephoto limit.

3. The zoom lens system as claimed in claim 1, wherein the reflecting surface bends by approximately 90° an axial principal ray from the object.

4. The zoom lens system as claimed in claim 1, wherein the reflecting surface bends into a horizontal direction the light beam from the object.

5. The zoom lens system as claimed in claim 1, wherein the lens element having a reflecting surface is a prism.

6. The zoom lens system as claimed in claim 1, wherein in zooming from the wide-angle limit to the telephoto limit at the time of imaging, the second lens unit does not move in the optical axis direction.

7. The zoom lens system as claimed in claim 1, wherein any one of the lens units, any one of the lens elements, or alternatively a plurality of adjacent lens elements that constitute one lens unit move in a direction perpendicular to an optical axis.

8. The zoom lens system as claimed in claim 7, wherein any one of the lens units other than the second lens unit, any one of the lens elements other than the lens element having a reflecting surface, or alternatively a plurality of adjacent lens elements that are other than the lens element having a reflecting surface and that constitute one lens unit move in a direction perpendicular to the optical axis.

9. The zoom lens system as claimed in claim 7, wherein any one of the lens units located on the image side relative to the second lens unit, any one of the lens elements that constitute any lens unit located on the image side relative to the second lens unit, or alternatively a plurality of adjacent lens elements that constitute one lens unit located on the image side relative to the second lens unit move in a direction perpendicular to the optical axis.

10. The zoom lens system as claimed in claim 7, wherein any one of the subsequent lens units moves in a direction perpendicular to the optical axis, and the following conditions (3) and (4) are satisfied in the entire zoom lens system:

$$Y_T > Y \quad (3)$$

$$0.0 < (Y/Y_T)/(f/f_T) < 3.0 \quad (4)$$

(where, $Z = f_T/f_W > 5.0$)

in which, f is a focal length of the entire zoom lens system, $f_T$ is the focal length of the entire zoom lens system at a telephoto limit, Y is an amount of movement of the lens unit that moves in a direction perpendicular to the optical axis at the time of maximum blur compensation in a focal length f of the entire zoom lens system, $Y_T$ is an amount of movement of the lens unit that moves in a direction perpendicular to the optical axis at the time of maximum blur compensation in a focal length $f_T$ of the entire zoom lens system at a telephoto limit, and $f_W$ is the focal length of the entire zoom lens system at a wide-angle limit.

11. A lens barrel for holding an imaging optical system that forms an optical image of an object, wherein the imaging optical system is a zoom lens system comprising a plurality of lens units each composed of at least one lens element, in which an interval between at least any two lens units among the lens units is changed so that an optical image of an object is formed with a continuously variable magnification, the zoom lens system, in order from the object side to the image side, comprises: a first lens unit having positive optical power; a second lens unit that includes a lens element having a reflecting surface for bending a light beam from an object and that has negative optical power; and subsequent lens units including at least one lens unit having positive optical power, and the following condition (1) is satisfied:

$$0.50 < (C-S)/H < 1.00 \quad (1)$$

where,

C is an effective radius of the image side surface of the most object side lens element in the second lens unit that causes an interval between the image side surface of the most object side lens element in the second lens unit and the lens element having a reflecting surface to be equal to a sag of the image side surface of the most object side lens element in the second lens unit $$C = \sqrt{(2R \cdot d_R - d_R^2)},$$

S is a sag of the image side surface of the most object side lens element in the second lens unit at height H, H is one-half of an optical axial thickness of the lens element having a reflecting surface, R is a radius of curvature of the image side surface of the most object side lens element in the second lens unit, and $d_R$ is an interval between the most object side lens element in the second lens unit and the lens element having a reflecting surface, and wherein in an imaging state, the first lens unit is held in a manner movable in a direction of the light ray from the object, and in an accommodated state, the lens element having a reflecting surface escapes to an escape position different from a position located in the imaging state.

12. The lens barrel as claimed in claim 11, wherein in the accommodated state, the second lens unit escapes to an escape position different from a position located in the imaging state.

13. The lens barrel as claimed in claim 12, wherein the second lens unit escapes in the optical axis direction toward the image side of the imaging optical system.

14. The lens barrel as claimed in claim 13, wherein the imaging optical system satisfies the following condition (5):

$$0.25 < \Sigma D / \Sigma d_4 < 0.60 \quad (5)$$

where, $\Sigma D$ is a total optical axial thickness of the lens units located on the image side relative to the second lens unit, and $\Sigma d_4$ is a total optical axial air space between the lens units that are located on the image side relative to the second lens unit and that move to the optical axis direction in zooming.

15. The lens barrel as claimed in claim 13, wherein the imaging optical system satisfies the following condition (6):

$$0.80 < (\Sigma D_{12} + H_2) / \Sigma d_4 < 1.25 \quad (6)$$

where, $\Sigma D_{12}$ is a total optical axial thickness of the first lens unit and the second lens unit, $H_2$ is the optical axial thickness of the lens element having a reflecting surface, and $\Sigma d_4$ is a total optical axial air space between the lens units that are located on the image side relative to the second lens unit and that move to the optical axis direction in zooming.

16. An imaging device capable of outputting an optical image of an object as an electric image signal, comprising:

an imaging optical system that forms the optical image of the object; and an image sensor that converts the optical image formed by the imaging optical system into the electric image signal, wherein the imaging optical system is a zoom lens system comprising a plurality of lens units each composed of at least one lens element, in which an interval between at least any two lens units among the lens units is changed so that an optical image of an object is formed with a continuously variable magnification, the zoom lens system, in order from the object side to the image side, comprises: a first lens unit having positive optical power; a second lens unit that includes a lens element having a reflecting surface for bending a light beam from an object and that has negative optical power; and subsequent lens units including at least one lens unit having positive optical power, and the following condition (1) is satisfied:

$$0.50 < (C-S)/H < 1.00 \tag{1}$$

where,

C is an effective radius of the image side surface of the most object side lens element in the second lens unit that causes an interval between the image side surface of the most object side lens element in the second lens unit and the lens element having a reflecting surface to be equal to a sag of the image side surface of the most object side lens element in the second lens unit $$C = \sqrt{(2R \cdot d_R - d_R^2)},$$

S is a sag of the image side surface of the most object side lens element in the second lens unit at height H, H is one-half of an optical axial thickness of the lens element having a reflecting surface, R is a radius of curvature of the image side surface of the most object side lens element in the second lens unit, and $d_R$ is an interval between the most object side lens element in the second lens unit and the lens element having a reflecting surface.

17. A camera for converting an optical image of an object into an electric image signal and then performing at least one of displaying and storing of the converted image signal, comprising:

an imaging device including an imaging optical system that forms the optical image of the object and an image sensor that converts the optical image formed by the imaging optical system into the electric image signal, wherein the imaging optical system is a zoom lens system comprising a plurality of lens units each composed of at least one lens element, in which an interval between at least any two lens units among the lens units is changed so that an optical image of an object is formed with a continuously variable magnification, the zoom lens system, in order from the object side to the image side, comprises: a first lens unit having positive optical power; a second lens unit that includes a lens element having a reflecting surface for bending a light beam from an object and that has negative optical power; and subsequent lens units including at least one lens unit having positive optical power, and the following condition (1) is satisfied:

$$0.50 < (C-S)/H < 1.00 \tag{1}$$

where,

C is an effective radius of the image side surface of the most object side lens element in the second lens unit that causes an interval between the image side surface of the most object side lens element in the second lens unit and the lens element having a reflecting surface to be equal to a sag of the image side surface of the most object side lens element in the second lens unit $$C = \sqrt{(2R \cdot d_R - d_R^2)},$$

S is a sag of the image side surface of the most object side lens element in the second lens unit at height H, H is one-half of an optical axial thickness of the lens element having a reflecting surface, R is a radius of curvature of the image side surface of the most object side lens element in the second lens unit, and $d_R$ is an interval between the most object side lens element in the second lens unit and the lens element having a reflecting surface.

\* \* \* \* \*